United States Patent
Kovachka-Dimitrova et al.

(10) Patent No.: US 7,747,698 B2
(45) Date of Patent: Jun. 29, 2010

(54) TRANSACTION MODEL FOR DEPLOYMENT OPERATIONS

(75) Inventors: Monika M. Kovachka-Dimitrova, Sofia (BG); Rumiana G. Angelova, Dimitrovgrad (BG)

(73) Assignee: SAP AG, Walldorf (DE)

( * ) Notice: Subject to any disclaimer, the term of this patent is extended or adjusted under 35 U.S.C. 154(b) by 1086 days.

(21) Appl. No.: 10/854,729

(22) Filed: May 25, 2004

(65) Prior Publication Data

US 2005/0278274 A1 Dec. 15, 2005

(51) Int. Cl.
*G06F 15/16* (2006.01)
*G06F 7/00* (2006.01)

(52) U.S. Cl. ............... 709/218; 709/207; 707/1
(58) Field of Classification Search ............... 707/1; 709/218
See application file for complete search history.

(56) References Cited

U.S. PATENT DOCUMENTS

| | | | |
|---|---|---|---|
| 5,596,714 A | 1/1997 | Connell | |
| 5,999,972 A | 12/1999 | Gish | |
| 6,253,282 B1 | 6/2001 | Gish | |
| 6,266,709 B1 | 7/2001 | Gish | |
| 6,272,555 B1 | 8/2001 | Gish | |
| 6,272,556 B1 | 8/2001 | Gish | |
| 6,304,893 B1 | 10/2001 | Gish | |
| 6,424,991 B1 | 7/2002 | Gish | |
| 6,434,598 B1 | 8/2002 | Gish | |
| 6,604,209 B1 | 8/2003 | Grucci et al. | |
| 6,643,650 B1 | 11/2003 | Slaughter et al. | |
| 6,725,453 B1 | 4/2004 | Lucas et al. | |
| 6,745,387 B1 * | 6/2004 | Ng et al. | 718/101 |
| 6,766,477 B2 | 7/2004 | Grucci et al. | |
| 6,801,940 B1 | 10/2004 | Moran et al. | |
| 6,832,238 B1 | 12/2004 | Sharma et al. | |
| 6,996,588 B2 | 2/2006 | Azagury et al. | |
| 7,076,798 B2 | 7/2006 | Chang et al. | |
| 7,080,092 B2 | 7/2006 | Upton | |
| 7,089,584 B1 | 8/2006 | Sharma | |
| 7,150,015 B2 * | 12/2006 | Pace et al. | 717/176 |
| 7,159,224 B2 | 1/2007 | Sharma et al. | |
| 7,167,914 B2 | 1/2007 | Cohen et al. | |
| 7,171,478 B2 | 1/2007 | Lueckhoff et al. | |
| 7,246,358 B2 | 7/2007 | Chinnici et al. | |
| 2001/0011265 A1 | 8/2001 | Cuan et al. | |
| 2002/0178254 A1 * | 11/2002 | Brittenham et al. | 709/224 |
| 2002/0188538 A1 | 12/2002 | Robertson et al. | |

(Continued)

OTHER PUBLICATIONS

Non-Final Office Action for U.S. Appl. No. 10/854,455; dated Jun. 9, 2009; 10 pages.

(Continued)

*Primary Examiner*—Yemane Mesfin
*Assistant Examiner*—Joiya M Cloud
(74) *Attorney, Agent, or Firm*—Blakley, Sokoloff, Taylor & Zafman LLP

(57) ABSTRACT

A system and method are described for performing deployment operations according to a transaction model. In one embodiment, a request to initiate a transaction to perform a deploy service operation is received. In response to the request, the transaction is initiated at a container. The transaction is then committed to a database if the transaction is successful. The successful transaction reflects the deploy service operation being completed at the container.

14 Claims, 19 Drawing Sheets

U.S. PATENT DOCUMENTS

| | | | |
|---|---|---|---|
| 2002/0188869 A1 | 12/2002 | Patrick | |
| 2003/0018694 A1* | 1/2003 | Chen et al. | 709/200 |
| 2003/0018832 A1 | 1/2003 | Amirisetty et al. | |
| 2003/0046639 A1 | 3/2003 | Fai et al. | |
| 2003/0050932 A1 | 3/2003 | Pace et al. | |
| 2003/0061247 A1 | 3/2003 | Renaud | |
| 2003/0093402 A1 | 5/2003 | Upton et al. | |
| 2003/0154266 A1* | 8/2003 | Bobick et al. | 709/223 |
| 2003/0191803 A1 | 10/2003 | Chinnici et al. | |
| 2003/0204645 A1 | 10/2003 | Sharma et al. | |
| 2003/0236923 A1 | 12/2003 | Jeyaraman et al. | |
| 2004/0068731 A1 | 4/2004 | Davis et al. | |
| 2004/0078495 A1 | 4/2004 | Mousseau et al. | |
| 2004/0078719 A1 | 4/2004 | Grucci et al. | |
| 2004/0139154 A1 | 7/2004 | Schwarze | |
| 2004/0148183 A1 | 7/2004 | Sadiq | |
| 2004/0148370 A1 | 7/2004 | Sadiq | |
| 2004/0148588 A1 | 7/2004 | Sadiq | |
| 2004/0205101 A1 | 10/2004 | Radhakrishnan | |
| 2005/0049938 A1 | 3/2005 | Venkiteswaran | |
| 2005/0080801 A1 | 4/2005 | Kothandaraman et al. | |
| 2005/0097178 A1* | 5/2005 | Bala | 709/207 |
| 2005/0165910 A1* | 7/2005 | Kilian | 709/219 |
| 2005/0262189 A1* | 11/2005 | Mamou et al. | 709/203 |
| 2005/0262477 A1 | 11/2005 | Kovachka-Dimitrova et al. | |
| 2005/0278274 A1 | 12/2005 | Kovachka-Dimitrova et al. | |
| 2007/0033088 A1 | 2/2007 | Aigner et al. | |

OTHER PUBLICATIONS

Final Office Action for U.S. Appl. No. 10/853,067 dated Jun. 9, 2009; 27 pages.

Office Action for U.S. Appl. No. 10/853,374, Mailed Jun. 25, 2009, 10 pages.

Non-Final Office Action for U.S. Appl. No. 10/852,893, Mailed Dec. 31, 2008, 11 pages.

Final Office Action for U.S. Appl. No. 10/853,374, Mailed Jan. 28, 2009, 13 pages.

Non-Final Office Action for U.S. Appl. No. 10/854,449 dated Apr. 29, 2009; 25 pages.

""Dreamweaver MX 2004 Using Dreamweaver"", *Macromedia*, Published: Sep. 10, 2003, pp. 1, 2, 59-61.

Kooijmans, Alex L., et al., "Enterprise JavaBeans for z/OS and OS/390 WebSphere Application Server 4.0", IBM Corporation: International Technical Support Organization, Chapter 5-7.

Orfali, Robert , "Client/Server Programming with JAVA and CORBA Second Edition", by Robert Orfali et al, (1998), pp. 1-230.

Non-Final Office Action for U.S. Appl. No. 10/854,449 Mailed Nov. 24, 2009, 34 Pages.

\* cited by examiner

TRANSACTION MODEL FOR DEPLOYMENT OPERATIONS

BACKGROUND

1. Field of the Invention

This invention relates generally to the field of deployment. More particularly, an embodiment relates to a system and method for performing deployment operations according to a transaction model.

2. Description of the Related Art

Traditional client-server systems employ a two-tiered architecture such as that illustrated in FIG. 1A. Applications 102 executed on the client-side 100 of the two-tiered architecture are comprised of a monolithic set of program code including a graphical user interface (GUI) component, presentation logic, business logic and a network interface that enables the client 100 to communicate over a network 103 with one or more servers 101. A database 104 maintained on the server 101 provides non-volatile storage for the data accessed and/or processed by the application 102.

As is known in the art, the "business logic" component of the application represents the core of the application, i.e., the rules governing the underlying business process (or other functionality) provided by the application. The "presentation logic" describes the specific manner in which the results of the business logic are formatted for display on the user interface. The "database" 104 includes data access logic used by the business logic to store and retrieve data.

The limitations of the two-tiered architecture illustrated in FIG. 1A become apparent when employed within a large enterprise. For example, installing and maintaining up-to-date client-side applications on a large number of different clients is a difficult task, even with the aid of automated administration tools. Moreover, a tight coupling of business logic, presentation logic and the user interface logic makes the client-side code very brittle. Changing the client-side user interface of such applications is extremely hard without breaking the business logic, and vice versa. This problem is aggravated by the fact that, in a dynamic enterprise environment, the business logic may be changed frequently in response to changing business rules. Accordingly, the two-tiered architecture is an inefficient solution for enterprise systems.

In response to limitations associated with the two-tiered client-server architecture, a multi-tiered architecture has been developed, as illustrated in FIG. 1B. In the multi-tiered system, the presentation logic 121, business logic 122 and database 123 are logically separated from the user interface 120 of the application. These layers are moved off of the client 125 to one or more dedicated servers on the network 103. For example, the presentation logic 121, the business logic 122, and the database 123 may each be maintained on separate servers, 126, 127 and 128, respectively.

This separation of logic components and the user interface provides a more flexible and scalable architecture compared to that provided by the two-tier model. For example, the separation ensures that all clients 125 share a single implementation of business logic 122. If business rules change, changing the current implementation of business logic 122 to a new version may not require updating any client-side program code. In addition, presentation logic 121 may be provided which generates code for a variety of different user interfaces 120, which may be standard browsers such as Internet Explorer® or Netscape Navigator®.

The multi-tiered architecture illustrated in FIG. 1B may be implemented using a variety of different application technologies at each of the layers of the multi-tier architecture, including those based on the Java 2 Platform, Enterprise Edition™ (J2EE) standard, the Microsoft .NET standard and/or the Advanced Business Application Programming (ABAP) standard developed by SAP AG.

For example, in a J2EE environment, such as the one illustrated in FIG. 1C, the business layer 122 is to handle the core business logic of the application having Enterprise Java-Bean™ (EJB or enterprise bean) components with support for EJB containers 134. While the presentation layer 121 is responsible for generating servlets and Java ServerPages™ (JSP or JSP pages) interpretable with support for Web containers 132 by different types of browsers at the client 125 via a web server 136 a network 103 (e.g., Internet or intranet).

The J2EE engine 130 is a tool commonly used in software development and deployment today. Generally, using the J2EE engine 130 reduces the costs and complexity associated with developing multi-tier enterprise services. Another advantage of J2EE engine 130 is that it can be relatively rapidly deployed and enhanced as the need arises. J2EE engine 130 is currently used in many large-scale application development and deployment projects for these reasons.

However, as application development projects grow larger and are diversified, deployment of applications becomes increasingly important. For example, it is useful to have an improved deployment service and management, including a variety of containers, application interfaces, transaction management and modules, notification and information status system, resource pooling, and security checks.

SUMMARY

A system and method are described for performing deployment operations according to a transaction model. In one embodiment, a request to initiate a transaction to perform a deploy service operation is received. In response to the request, the transaction is initiated at one or more recognized containers that include components of that particular application. The transaction is then committed to a database if the transaction is successful. The successful transaction reflects the deploy service operation being completed at relative containers.

BRIEF DESCRIPTION OF THE DRAWINGS

The appended claims set forth the features of the invention with particularity. The embodiments of the invention, together with its advantages, may be best understood from the following detailed description taken in conjunction with the accompanying drawings in which:

DETAILED DESCRIPTION

Figure 1A:
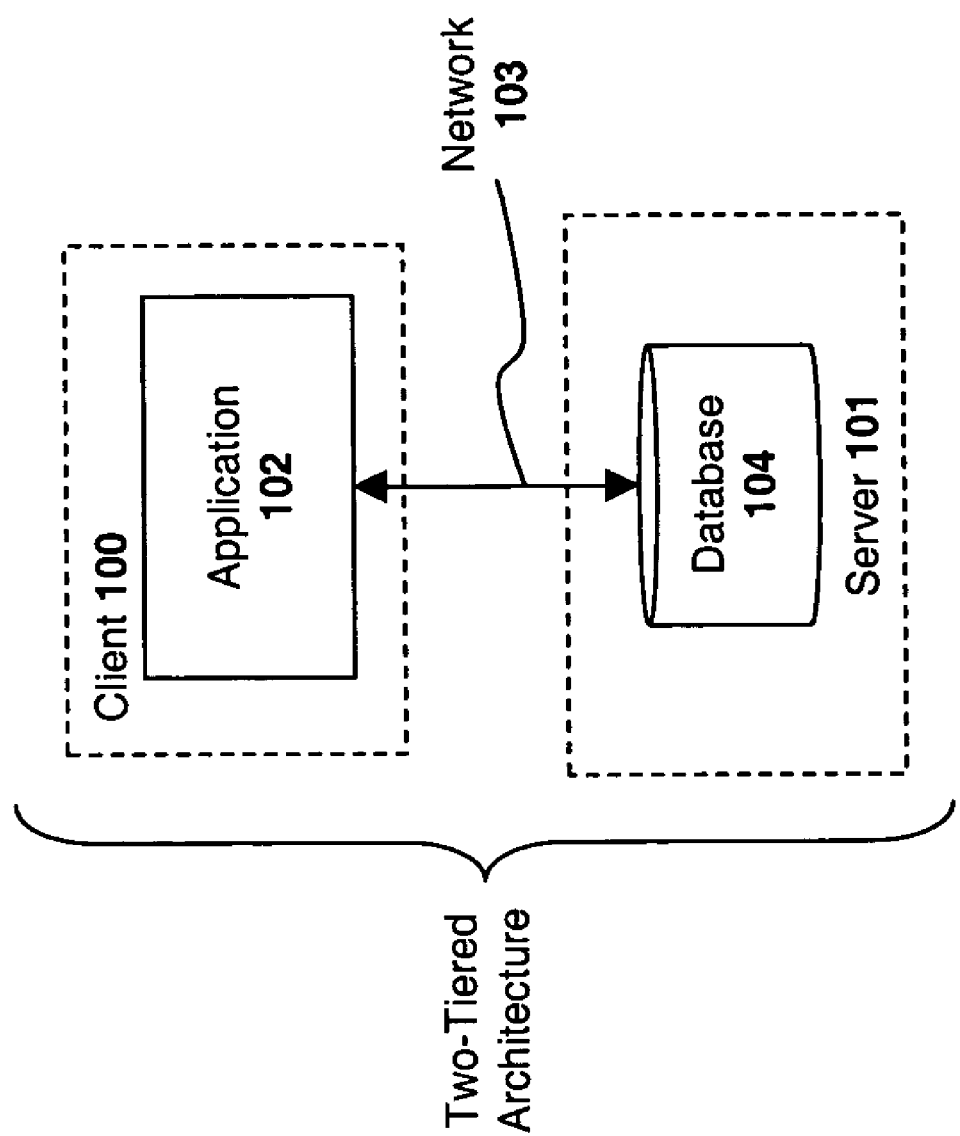
FIG. 1A is a block diagram illustrating a prior art two-tier client-server architecture.
Figure 1B:
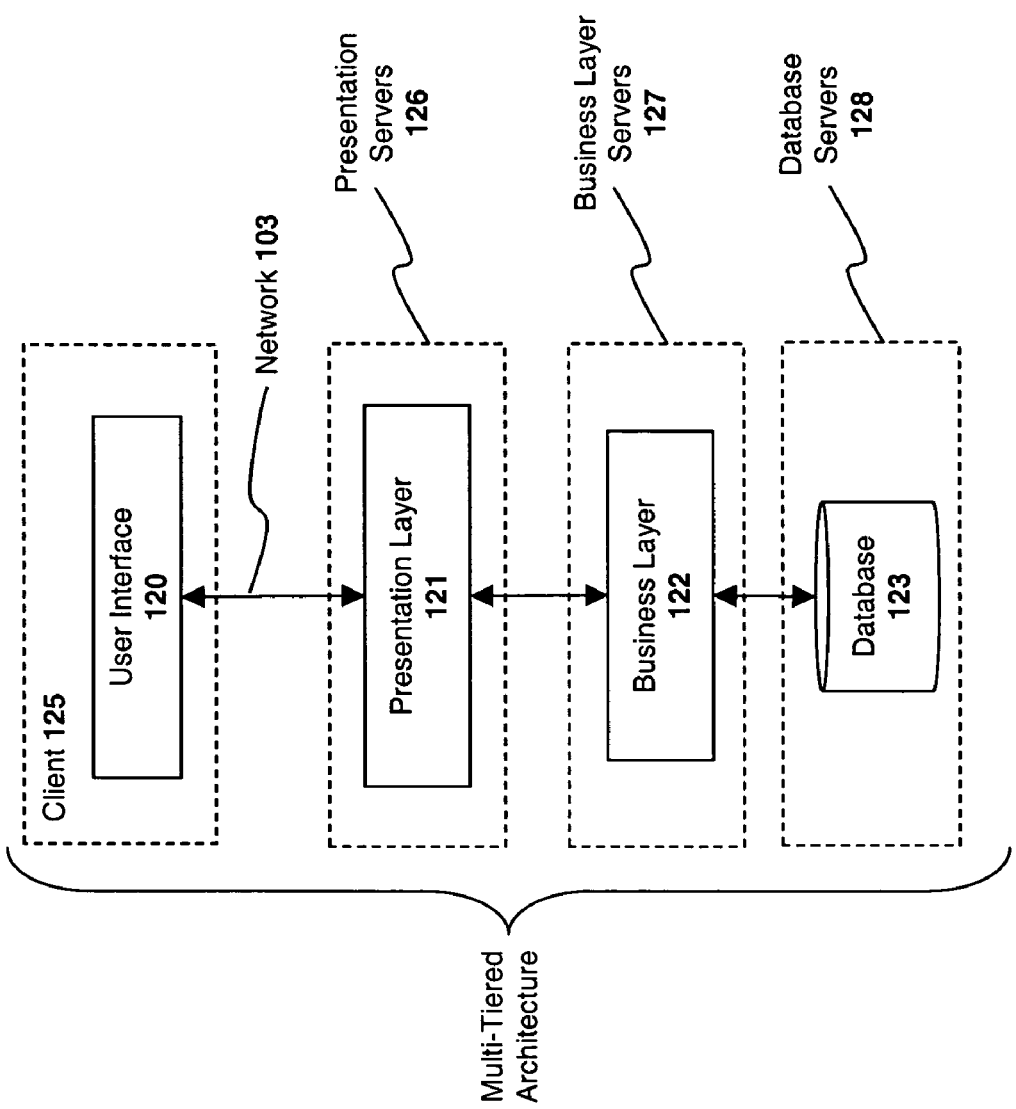
FIG. 1B is a block diagram illustrating a prior art multi-tier client-server architecture.
Figure 1C:
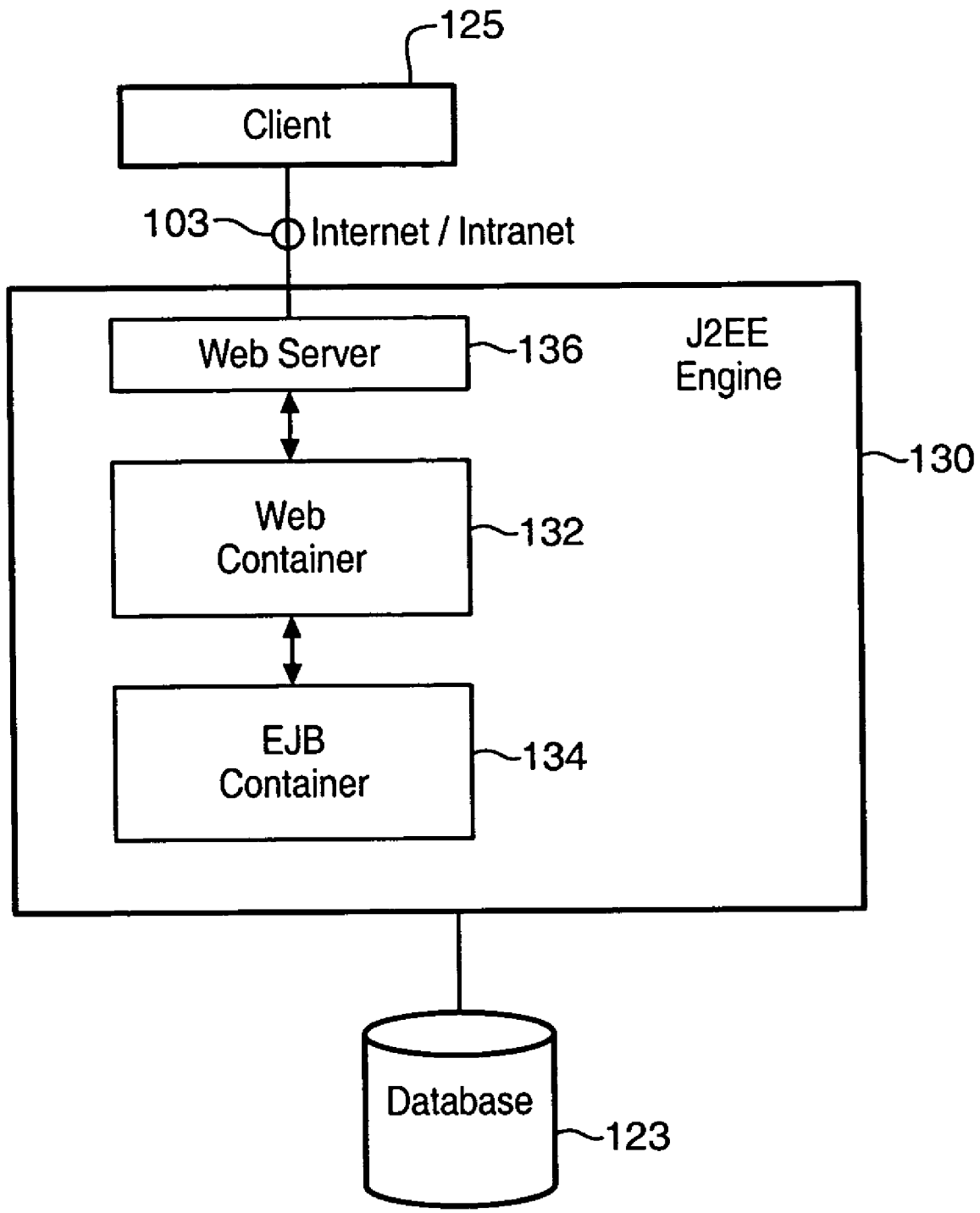
FIG. 1C is a block diagram illustrating a prior art J2EE environment.

Described below is a system and method for employing a transactional model for deployment operations. Throughout the description, for the purposes of explanation, numerous specific details are set forth in order to provide a thorough understanding of the embodiments of the present invention. It will be apparent, however, to one skilled in the art that the present invention may be practiced without some of these specific details. In other instances, well-known structures and devices are shown in block diagram form to avoid obscuring the underlying principles of the present invention.

In the following description, numerous specific details such as logic implementations, opcodes, resource partitioning, resource sharing, and resource duplication implementations, types and interrelationships of system components, and logic partitioning/integration choices may be set forth in order to provide a more thorough understanding of various embodiments of the present invention. It will be appreciated, however, to one skilled in the art that the embodiments of the present invention may be practiced without such specific details, based on the disclosure provided. In other instances, control structures, gate level circuits and full software instruction sequences have not been shown in detail in order not to obscure the invention. Those of ordinary skill in the art, with the included descriptions, will be able to implement appropriate functionality without undue experimentation.

Various embodiments of the present invention will be described below. The various embodiments may be performed by hardware components or may be embodied in machine-executable instructions, which may be used to cause a general-purpose or special-purpose processor or a machine or logic circuits programmed with the instructions to perform the various embodiments. Alternatively, the various embodiments may be performed by a combination of hardware and software.

Various embodiments of the present invention may be provided as a computer program product, which may include a machine-readable medium having stored thereon instructions, which may be used to program a computer (or other electronic devices) to perform a process according to various embodiments of the present invention. The machine-readable medium may include, but is not limited to, floppy diskette, optical disk, compact disk-read-only memory (CD-ROM), magneto-optical disk, read-only memory (ROM) random access memory (RAM), erasable programmable read-only memory (EPROM), electrically erasable programmable read-only memory (EEPROM), magnetic or optical card, flash memory, or another type of media/machine-readable medium suitable for storing electronic instructions. Moreover, various embodiments of the present invention may also be downloaded as a computer program product, wherein the program may be transferred from a remote computer to a requesting computer by way of data signals embodied in a carrier wave or other propagation medium via a communication link (e.g., a modem or network connection).

Figure 2:
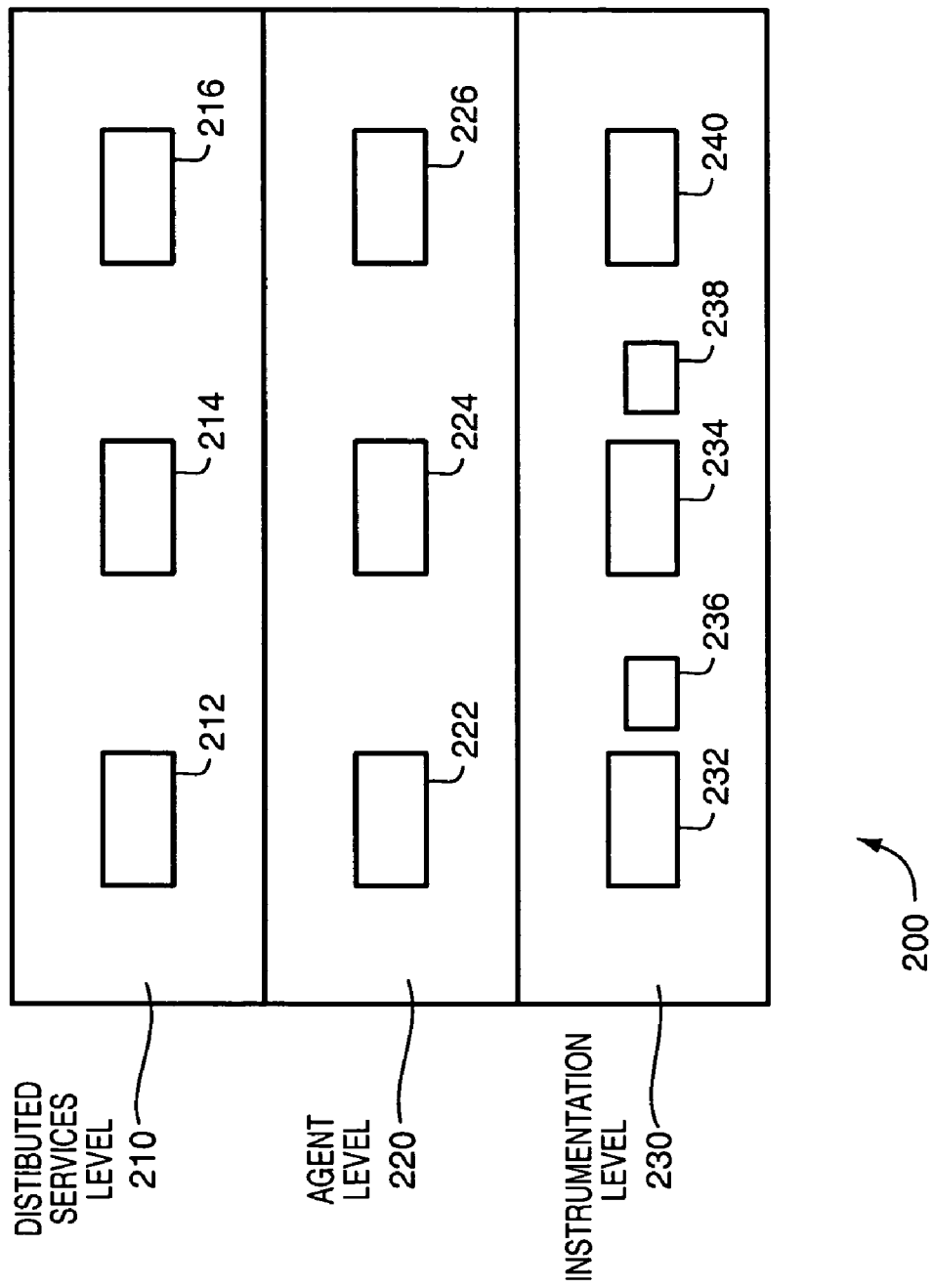
FIG. 2 is a block diagram illustrating an embodiment of Java management architecture in which embodiments of the present invention may be implemented.

FIG. 2 is a block diagram illustrating an embodiment of Java management architecture (JMA) 200 in which embodiments of the present invention may be implemented. The illustrated embodiment of JMA 200 is based on Java Management Extensions (JMX). The JMA 200 includes three layers or levels 210, 220, 230, including a distributed services level (or manager or user or client level) 210, an agent level (or application level) 220, and an instrumentation level (or database level) 230. Some or all of the elements at each of levels of the JMA 200 may be, directly or indirectly, interconnected via a network (e.g., a Local Area Network (LAN)). Alternative embodiments of the JMA 200 may include more or fewer levels.

The distributed services level 210 serves as an interface between the JMA 200 and one or more users or clients. As illustrated, the distributed services level 210 includes one or more user terminals 212-214. One or more of the user terminals 212-214 to collect and gather user input and send it to the agent level 220 over a network connection. Network connection may be a wired or wireless connection to a LAN, a Wide Area Network (WAN), a Metropolitan Area Network (MAN), an intranet, and/or the Internet. Distributed services level terminals 212-214 include personal computers, notebook computers, personal digital assistants, telephones, and the like. According to one embodiment in which the network connection connects to the Internet, one or more of the user terminals 212-214 may include a Web browser (e.g., Internet Explorer or Netscape Navigator) to interface with the Internet.

According to one embodiment, the distributed services level 210 also includes management applications 216, such as a JMX-compliant management application, a JMX manager, and/or a proprietary management application. The management applications 216 also include one or more graphical management applications, such as a visual administrator, operating to, for example, retrieve and display information received from the agent level 220 and/or the instrumentation level 230.

The visual administrator includes a monitor viewer to display such and other information. The monitor viewer may be GUI-based or Web-based monitor viewer. Management applications 216 may include third party tools including a file system to store the information. The distributed services level 210 includes the CCMS system described above.

The agent level 220 includes one or more application servers 222-226. An application server may refer to a computing device that performs data processing. The agent level 220 also includes a computing device (e.g., a dispatcher) to perform load balancing among application servers 222-226. According to one embodiment in which the agent level 220 exchanges information with the distributed services level 210 via the Internet, one or more of the application servers 222-226 include a Web application server. According to one embodiment, the application servers 222-226 are implemented in accordance with J2EE v1.3, final release Sep. 24, 2001, published on Jul. 18, 2002 (the J2EE Standard). An update of J2EE v1.3 was recently released, on Nov. 24, 2003, as J2EE v1.4. In one embodiment, the management techniques described herein are used to manage resources within a "cluster" of server nodes. An exemplary cluster architecture is described below with respect to FIGS. 14-15. However, the underlying principles of the invention are not limited to any particular application server architecture.

The applications servers 222-226 may include one or more dedicated Java Managed Bean (MBean or managed bean) servers having agent services. According to one embodiment, for and at each Java virtual machine (JVM) with managed resources, there may be one or more agents operating at the agent level 220. The one or more agents include one or more MBean servers, agent services, a set of MBeans, one or more connectors, and/or one or more protocol adaptors. An MBean Server includes a registry for MBeans and acts as a single entry point for calling MBeans in a uniform fashion from management applications at other JVMs.

The instrumentation level 230 provides a data storage medium for the JMA 200. As illustrated, according to one embodiment, the instrumentation level 230 includes one or more database management systems (DBMS) 232-234 and data sources 236-238. According to one embodiment, the data sources 236-238 may include databases and/or other systems capable of providing a data store. Furthermore, the instrumentation level 230 includes one or more hosts including one or more resources having MBeans, such as instrumentation MBeans. The instrumentation level 230 may make Java objects available to management applications 216. The Java objects instrumented according to the JMX-standard may include MBeans. The resources represented by MBeans include managed resources 240, including a kernel, a server component, or the like. MBeans may expose a management interface including constructors, attributes, operations, and notifications.

Figure 3:
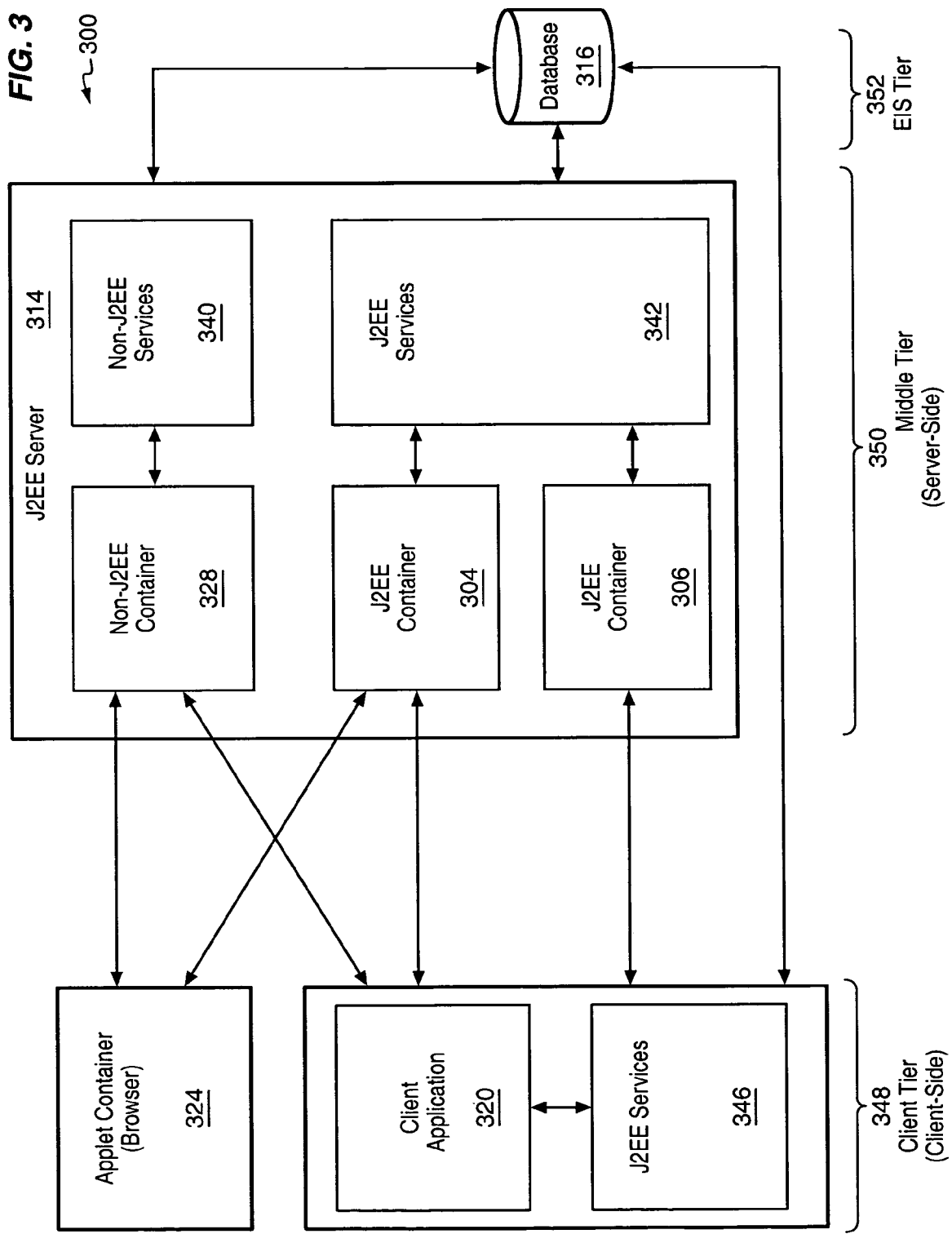
FIG. 3 is a block diagram illustrating an embodiment of a multi-tiered J2EE architecture having a J2EE server employing J2EE and non-J2EE containers and services.

FIG. 3 is a block diagram illustrating an embodiment of a multi-tiered J2EE architecture 300 having a J2EE server 314 employing J2EE and non-J2EE containers 304-306, 328 and services 340-342. As illustrated, the multi-tiered J2EE architecture 300 includes a J2EE server (or engine) 314 having J2EE containers 304-306 on the server-side, and more particularly, in the middle tier 350. The middle tier 350 of the J2EE server (or engine) 314 includes the presentation logic (e.g., Web tier) and business logic (e.g., business tier). Examples of the server-side J2EE containers 304-306 include Web containers and EJB containers. The client tier 348 includes a client application 320 to provide J2EE services 306. The client tier 348 may also include an applet container having a browser 324 to display information.

The J2EE containers 304-306 and the client application 320 are, directly or indirectly, in communication with the database 316, located at the Enterprise Information Systems (EIS) tier 352 of the multi-tiered J2EE architecture 300. The database 316 may include one or more database servers, EJB servers, old systems, and mySAP components. The client application 320 may include standard a J2EE application to help facilitate the running of applications in standalone JVMs. Furthermore, the clients may access one or more of the applications via standalone Java programs and programs that help access an application via, for example, using Internet Inter-Object Request Broker Protocol (IIOP)/Common Object Request Broker Architecture (COBRA) written using any programming language (e.g., –C, C, and C++).

The J2EE containers 304-306 in the middle tier 350 are associated with various J2EE services and APIs 342, examples of which, include Java Naming Directory Interface (JNDI), Java Database Connectivity (JDBC), J2EE connector Architecture (JCA), Remote Invocation (RMI), Java Transaction API (JTA), Java Transaction Service (JTS), Java Message Service (JMS), Java Mail, Java Cryptography Architecture (JCA), Java Cryptography Extension (JCE), and Java Authentication and Authorization Service (JAAS), and dbpool service. The J2EE services 402 further include EJB_service, servlet_JSP, application_client_service, connector_service to provide (J2EE containers 304-306, namely) EJB containers, Web containers, application client containers, and connector containers, respectively. It is contemplated the client application 320 may also be associated with a set of J2EE services and APIs 346. However, each of the containers 304-306 may be associated with a different set of J2EE services. For example, on the client tier 348, the client application may be associated with different J2EE services 346 than the J2EE containers 304-306 associated with the J2EE services 342 on the server-side 350. Furthermore, the client-side 348 may or may not be J2EE-based.

According to one embodiment, as illustrated, the J2EE server 314 includes a non-J2EE container 328 and a set of non-J2EE services and interfaces 340. An example of a non-J2EE container 328 and non-J2EE services 340 may include an SAP container and a set of SAP services and APIs, respectively. The non-J2EE services 340 include Webdynpro service, log_configurator service, and monitoring service. According to one embodiment, non-J2EE components deployed in the non-J2EE container 328 may be used to assemble non-J2EE applications (e.g., SAP applications). In one embodiment, the management of the non-J2EE applications is performed during and after deployment, while the assembly of the non-J2EE applications is conducted prior to deployment. According to one embodiment, both the J2EE and non-J2EE containers 304-306, 328 may have access to the J2EE and non-J2EE services 340-342.

According to one embodiment, some of the non-J2EE services 340 may include parallel or similar services to the J2EE services 342. The container API may be used to facilitate registration, unregisteration, implementation, and management of not only the J2EE containers 304-306, but also one or more non-J2EE containers 328 on the J2EE server 314. Using a common container API, both the standard J2EE containers 304-306 and the non-J2EE containers 328 may be deployed on the server-side 350, and the J2EE server 314, as whole, regards them as the same. Stated differently, when deploying a non-J2EE container 328, the specific details in the implementation and logic of the non-J2EE container 328 may be kept hidden from the J2EE server 314 so all J2EE and non-J2EE containers 304-306, 328 are to be recognized and regarded the same way as part of the J2EE architecture 300.

The container API, according to one embodiment, is encapsulated in a service 340-342. This is to, for example, expand the J2EE architecture 300 to provide a relatively easy implementation and deployment of services, interfaces, and libraries, and to provide one or more non-J2EE containers 328, which in turn can deploy any non-J2EE components with relative ease using the same infrastructure. The container API may be represented by an interface defined as a development component with the name, e.g., <container_api>. The implementation of container API may be performed using the deploy service.

According to one embodiment, the deploy service may be used as an entry point for extending the J2EE architecture 300 and for enhancing the functionality of the J2EE engine 314 by deploying the non-J2EE containers 328 along with the J2EE containers 304-306. The deploy service may also be used for the deployment of applications, standalone modules (containing both J2EE and non-J2EE components), service, and libraries.

Figure 4:
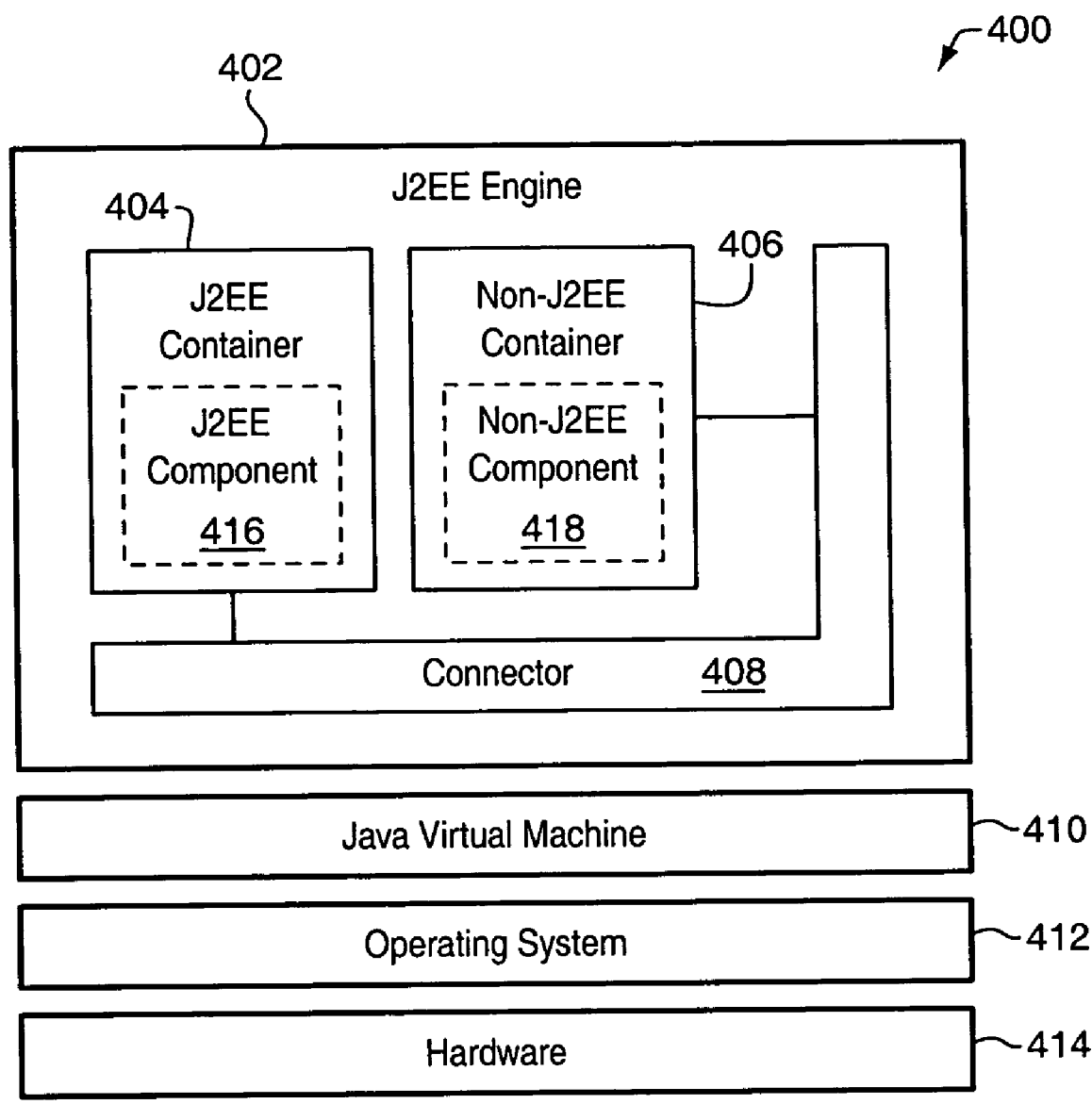
FIG. 4 is a block diagram illustrating a J2EE architecture having J2EE and non-J2EE containers residing on a J2EE engine.

FIG. 4 is a block diagram illustrating a J2EE architecture 400 having J2EE and non-J2EE containers 404-406 residing on a J2EE engine 402. In the illustrated embodiment, the J2EE engine (or server) 402 includes both a J2EE container 404 and a non-J2EE container 406. The J2EE container 404 manages a J2EE component 416, which may be part of a J2EE application. The non-J2EE container 406 manages a non-J2EE component 418, which may be part of a non-J2EE application. The term non-J2EE may refer to a non-J2EE standard element, such as a container 406, component 418, and application and may be synonymous with SAP AG.

The J2EE architecture 400 further includes connectors 408 to provide standard services and APIs to connect the J2EE server 402 and its elements with the rest of the J2EE architecture 400. The connectors 408 may be J2EE or non-J2EE based. The J2EE architecture 400 also includes a JVM 410 to process platform-independent bytecode into platform-specific native code or binary machine code at runtime. The binary machine codes is executed on a hardware 414 using an operating system 412. The operating system 412 may include Microsoft Windows®, Macintosh, Unix, Linux, and the like. The hardware 414 may include a computer processing unit, a storage device, a random access memory, and the like.

Figure 5:
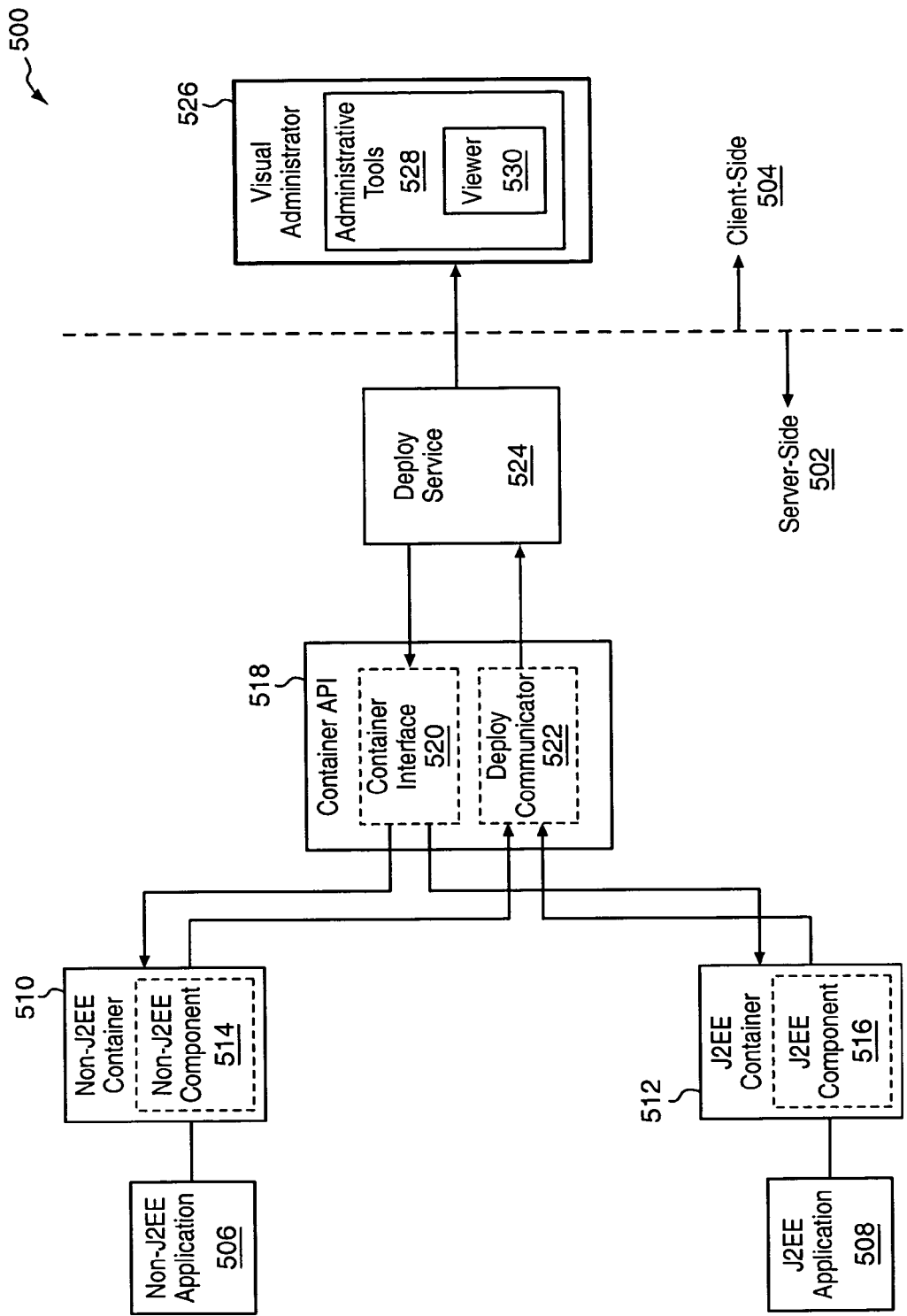
FIG. 5 is a block diagram illustrating a J2EE architecture having a deploy service.

FIG. 5 is a block diagram illustrating a J2EE architecture 500 having a deploy service 524. According to one embodiment, the deploy service 524 serves to extend and enhance the J2EE architecture 500 and its functionalities. The deploy service 524 along with the container API (e.g., SAP container API) 518 help facilitate the deploying of various deployable entities, including J2EE and non-J2EE components 514-516 using J2EE and non-J2EE containers 510-512, respectively. The container API 518 is represented on the server as an interface defined as a development component.

Serving as an entry point for expanding and enhancing the J2EE architecture 500, the deploy service 524 is also used for correct distribution of the deployable entities to their services/containers and a storage place. The storage place is retrieved from configuration manager in the database and the deploy service 524 is to facilitate the storage of all applications so that the containers 510-512 may rely on a consistent storage for the entire application. The application components 514-516 and standalone modules are managed by the containers 510-512, the libraries, services, and interfaces are managed by server's deploy context, which is located at a deeper level in the core of the server because these deployable components are used by applications 506-508 found on a higher level in the J2EE architecture 500. Stated differently, deploy service 524 is used to manage an entire application 506-508, the container 510-512 is used to manage the applications' components 514-516, and the deploy context is used to manage the server components, such as the libraries, services and interfaces. According to one embodiment, the deploy service 524 may obtain the deploy context using its application service context.

According to one embodiment, the container API 518 provides a container interface 520 that is implemented by container services associated with the containers 510-512 (e.g., com.sap.engine.services.deploy.container.ContainerInterface). Such implementation is to facilitate the deploy service 524 to identify and process various actions on those containers 510-512 that are implemented according to a set of rules including the implementation of the container API 518 by container services. A container service may listen for the availability of the container interface by implementing a container event listener (e.g., com.sap.engine.frame.container.event.ContainerEventListener).

The container API 518 provides a container management for registration of containers 510-512 by container services when an event indicating the availability of the container API 518 (e.g., <container_api>) is received or listened to by a container service via the container event listener. The container service may then register the container 510-512 using container management. In contrast, when a container 510-512 is rendered not available that container 510-512 is unregistered using the container management (e.g., <com.sap.engine.services.deploy.container.ContainerManagement>). Stated differently, the container services are provided with an opportunity to register their corresponding containers 510-512 with the container API 518 and the deploy service 524 when the containers 510-512 become available and are ready to to perform deployment operations. In contrast, the containers 510-512 may be unregistered when once they stop or become unavailable.

According to one embodiment, the container API 518 also includes deploy communicator 522 in combination with the container interface 520. The availability of the deploy communicator 522 allows the deploy service 524 and the containers 510-512 to communicate bi-directionally. Stated differently, using the container interface 520, the information flows from the deploy service 524 to the containers 510-512. Each of the containers 510-512 may obtain an instance of the deploy communicator 522 during its registration to communicate back with the deploy service 524.

Using the deploy communicator 522, the information may flow from the containers to the deploy service 524. Such information may include information relating to the status, requesting runtime information, initiating operations from containers 510-512, etc., flowing back to the deploy service 524. Such information allows the deploy service 524 to be more efficient by, for example, allowing the containers 510-512 to request to lock the application or changes that may occur due to some property changes in the container 510-512, or by having the deploy service 524 request the changes by update. Another example includes allowing a container 510-512 to stop its deployed applications in the container service stop method, since applications are usually consisting of more than one component and the deploy service 524 may know the entire configuration of an application.

According to one embodiment, the instance of container information (e.g., <container info>) including information for identification of a container 510-512 may have a set of properties with set/get methods. Some of the properties include: (1) determination of whether a container 510-512 is a J2EE container 512 (e.g., EJB, Web, application, client, resource adapter) or a non-J2EE container 510 (e.g., SAP container); (2) for J2EE containers 512, specification of the type of the components 516 deployed (e.g., String j2eeModuleName); (3) for non-J2EE containers 510, specification of the type of the components 514 deployed (e.g., String moduleName); (4) for specification of the priority of a container 510-512 (e.g., when an application is being deployed, stopped, and started), the deploy service 524 knows in what order to notify the concerned containers 510-

512. During deployment and start of an application, the containers 510-512 having higher priority are notified first, and during stop of an application the containers 510-512 with lower priority are first notified (e.g., int priority); (5) specification of a container's unique name (e.g., String name); (6) specification of a set of extensions of files which represents components 514-516 deployed on the respective containers 510-512 (e.g., String [ ] fileExtentions); (7) specification of a set of names of files which represent components 514-516 deployed on the respective containers 510-512 (e.g., String [ ] filenames); (8) specification of the name of the service that provides the container (e.g., String serviceName); (9) determination of whether the container 510-512 supports the operation "single file update" (e.g., Boolean supportsSingleFileUpdate); and (10) specification of the kind of resource types that are supported by the container (e.g., String [ ] resourceTypes).

According to one embodiment, filenames and extensions may be used by the deploy service 524 for distribution of the deployable components 514-516 on the containers 510-512. The deploy service 524 may include a mechanism for automatic recognition of the container 510-512 to which the corresponding deploying components 514-516 may be distributed, in accordance with the filenames and extensions contained in the <container info> of each of the containers 510-512. For example, if a standalone module file has an extension Web ARchive (e.g., War or war), and the J2EE Web container has specified this extension in its <container info>, the deploy service 524 may distribute a WAR file to the Web container.

Figure 6:
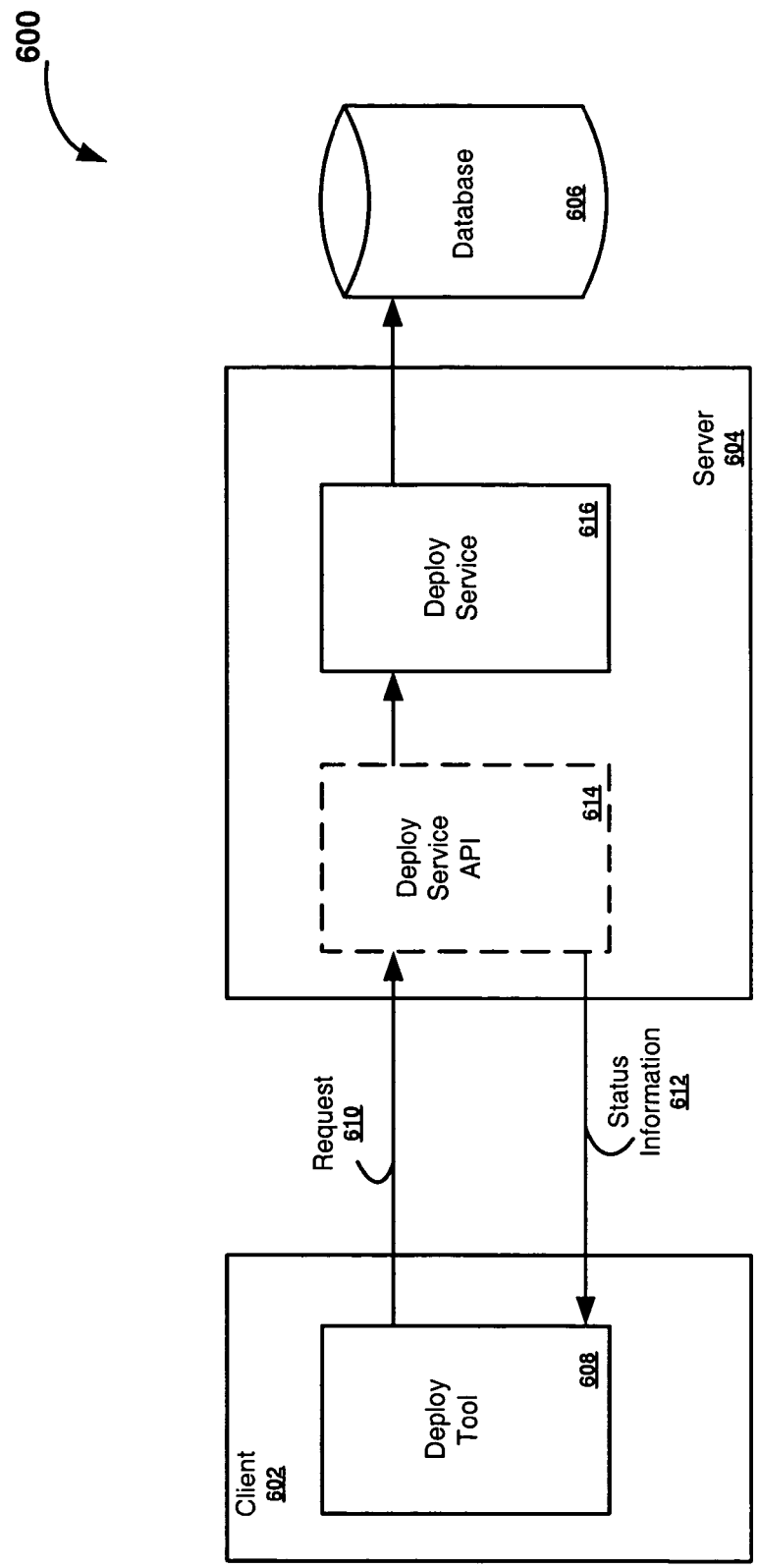
FIG. 6 is a block diagram illustrating an overview of an embodiment of a J2EE architecture having a deployment architecture including a deploy service.

FIG. 6 is a block diagram illustrating an overview of an embodiment of a J2EE architecture having a deployment architecture 600 including a deploy service 616. The J2EE architecture 600 includes a client 602 in communication with a server 604. The communication between the client 602 and the server 604 may be a bi-directional communication 610-612. The bi-directional communication is facilitated by a deploy service API and the deploy callback system. The server 604 is coupled with a database 606 to store the information communicated to the database 606 from the server 604.

In the illustrated embodiment, the client 602 initiates the request 610 for starting the operation of the deploy service with the server 604 via a deploy service API 614. The server 604, in response to the initiation request 610 from the client 602, propagates the deploy service 616. According to one embodiment, the deploy service 616 includes a module to accept applications on the server 604, distribute various components of the applications to containers, help manage the containers, facilitate control of the application life cycles and to synchronize them with the component life cycles deployed in the containers. Stated differently, the deploy service 616 is referred to as the entry point for extending and enhancing the functionality of the deployed applications, containers, and of the J2EE architecture 600 as a whole.

Figure 7:
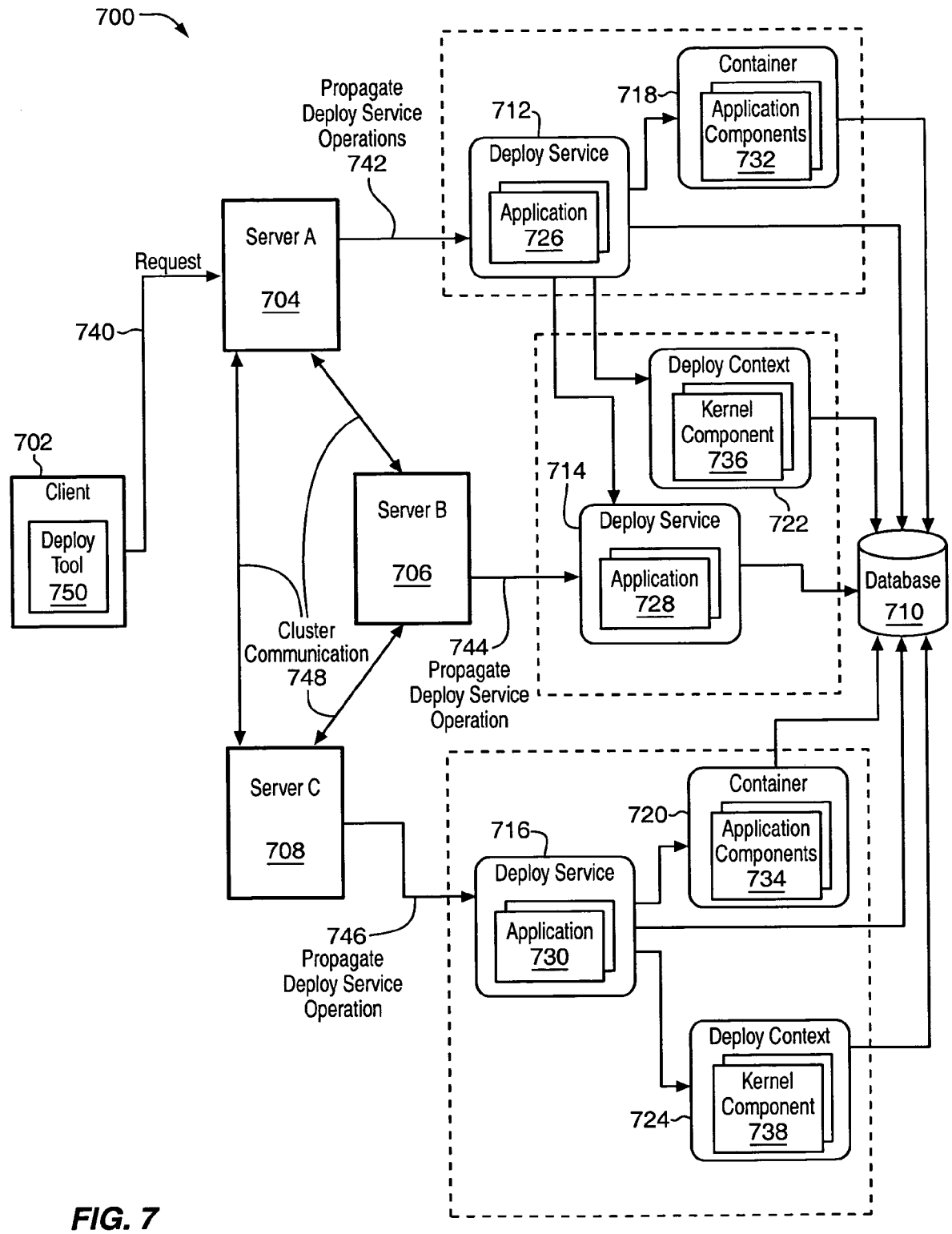
FIG. 7 is a block diagram is an embodiment of a J2EE architecture having a cluster of servers, each server having a deploy service.

FIG. 7 is a block diagram is an embodiment of a J2EE architecture 700 including a cluster of servers 704-708, each server having a deploy service 712-716. It is contemplated, the number of clients 702 and servers 704-708 may vary from one to several. In the illustrated embodiment, the deploy service 712 may be implemented or the operation of the deploy service 712 may be triggered or propagated 742-746 by a server 704 upon receiving a command from the client 702 or in response to a request 740 from the client 702. The server 704 communicates 748 with other servers 706-708 in the cluster regarding the deploy service 712 by sending a notification to each of the servers 706-708. With the notification, the deploy service 714-716 may then be initiated at other servers 706-708 along with the server 704 receiving the request from the client 702 to perform application deployment operations. The server 704 may use the deploy callback system to perform the process of notification. The failure at one or more servers (e.g., server 706) may not stop or interfere with the other servers (e.g., 704 and 708) in continuing with the deploy service-related operations. It is contemplated, each of the servers or server nodes 704-708 may have a corresponding deploy service 712-716, each of the servers 704-708 use one deploy service (e.g., 712) having implemented or deployed from one server (e.g., 704).

According to one embodiment, the client 702 starts the operation and deployment of the deploy service 740 with a server 704 via a deploy service API and using a deploy tool 750. The submitting of the request 740 triggers the propagating of the deploy service 712 at the server 704. In one embodiment, a cluster communication 748 may start between various servers 706-708 initiating from the server 704 receiving the request 740 from the client 702. Such cluster communication 748 facilitates deploy service propagation 742-746 of the deploy service 712-716 at all server nodes 704-708. There may be further communication between deploy services, such as between deploy services 712-714, and between other elements of the J2EE architecture 700.

According to one embodiment, the deploy service 712-716 performs distribution of a deployed application 726-730 in the cluster. The deploy service 712, 716 further performs distribution of the deployed application's 726, 730 components 732-734 in the containers 718-720 of the corresponding server nodes 704, 708. The management of the deployed applications 726-730 by the deploy services 712-716 may include maintaining consistent state of the applications 726-730 in the cluster, maintaining consistent state of the application components 732-734, performing life cycle or deploy operations of the applications 726-730 (e.g., deploy, start, stop, update, and remove), performing transactional operations over the applications 726-730, using the deploy callback system to notify the deploy listeners of the status information and events relating to the deployed applications 726-730 and their components 732-734, and resolving the application references to all other components.

A deploy service 712-716 may be implemented as a module and may serve as an entry point for extending and enhancing the functionality of the servers 704-708 and the J2EE architecture 700 by maintaining and facilitating the deployment of a set of online components to the server, such as the applications 726-730, standalone modules, libraries, interfaces and services. The deploy service 712-716 is also responsible for distribution of these deployable entities to their runtime managers. For example, the application components 732-734 and standalone modules are managed by the containers 718-720 that are implemented using the container API. The libraries, interfaces, and services, regarded as kernel components 736-738, are managed by deploy context 722-724 at a deeper level in the core of the server 706-708. The kernel components 736-738 are used by the applications 726, 730 at a higher level in the J2EE architecture 700.

Stated differently, the deploy service 712-716 helps manage the applications 726-730, the containers 718-720 help manage the application components 732-734, and the deploy context 722-724 facilitates the management of server or kernel components 736-738, such as libraries, interfaces, and services. A part of the container API may be used to administer the containers 718-720 and may be implemented using the deploy service 712-716. Furthermore, the deploy service 712 as a module is used to collect the active containers 718-

720 as they are registered. Each of the components 736-738 managed by their containers 718-720 are associated with an application 726 730. For standalone modules, they may be associated with dummy applications (e.g., empty wrapper).

The deploy service 712-716, according to one embodiment, may perform a transaction-oriented management of the applications 726-730. For example, the deploy service 712-716 may use a persistent storage or a database 710 for storing the deployment state or status information relating to the deployment of the applications 726-730. The operations, such as the deploy operations, being performed over an application 726-730 are transactionally recorded on to the database 710 in parallel with the logical transaction of such operations. In one embodiment, the container operations are regarded as part of the deploy service 712-716 and each operation being performed in the deploy service 712-716 having an equivalent in the container API. An operation, such as start, is regarded successfully completed if the corresponding containers 718-720 have completed the operation. The transaction relating to the completed operation is then committed (e.g., recorded) in the database 710. If the operation is incomplete in any of the container and is regarded as incomplete and is rolled back to a previous state. The transaction relating to the incomplete operation may not be committed to the database 710.

Figure 8:
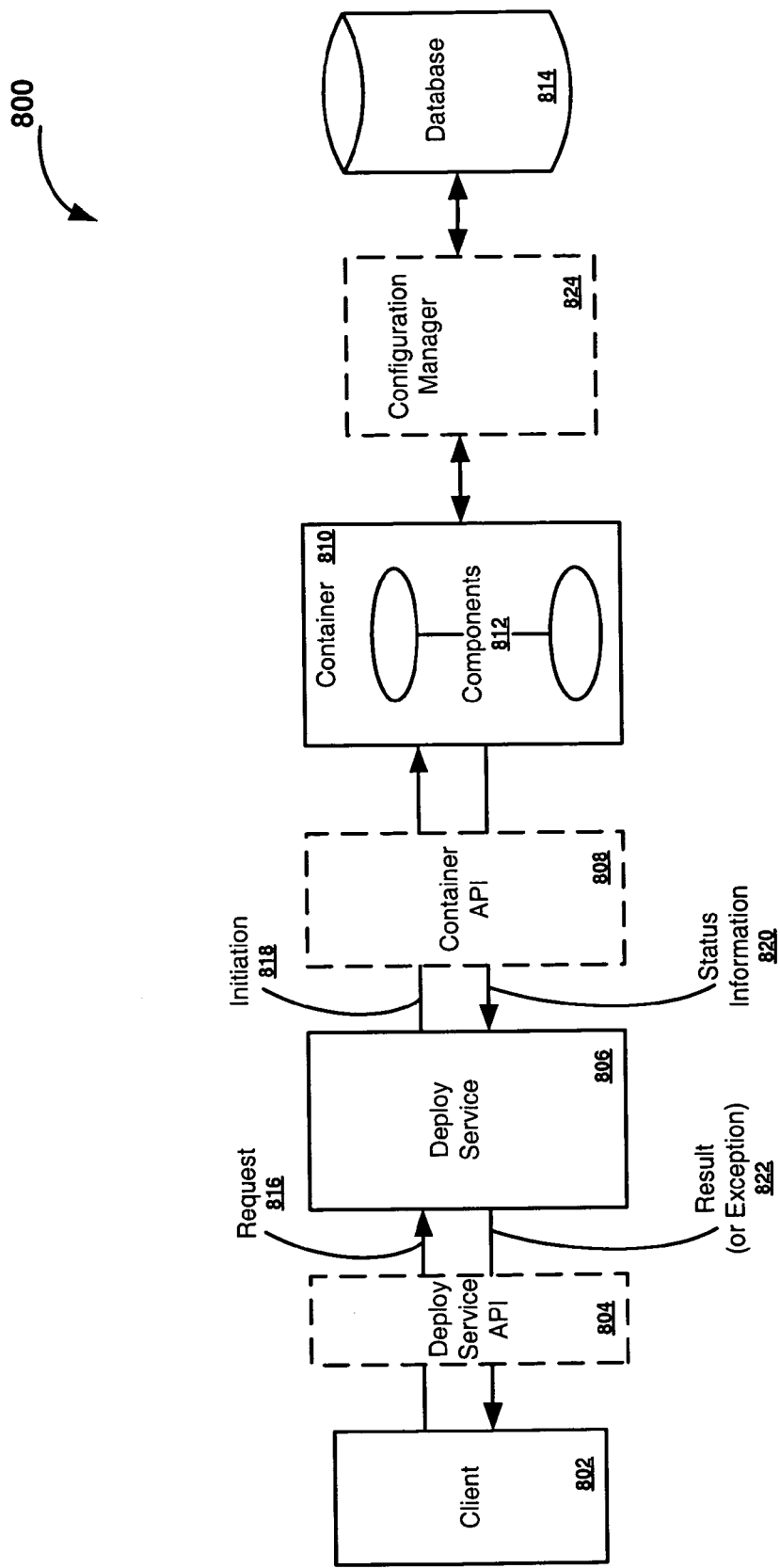
FIG. 8 is a block diagram of an embodiment of a J2EE architecture having a deployment architecture.

FIG. 8 is a block diagram of an embodiment of a J2EE architecture having a deployment architecture 800. In the illustrated embodiment, the deployment architecture 800 includes a client 802 to request the deployment of an application or other entities and the results 822 of the status information 820 relating to the deploy operations corresponding to the deployment of the application. The client 802 may include a deployer or administrator for performing configuration and deploying of various J2EE and non-J2EE modules on a specific product. The deployer or administrator may include a person or company to configure, deploy, and request execution of applications, administer the computing and networking infrastructure where the applications run, and oversees the runtime environment. Additional duties may include setting transaction controls and security attributes and specifying connections to databases.

In one embodiment, the process of deployment may include: (1) configuration; (2) distribution; and (3) execution. To perform configuration, the client 802, as a deployer, may follow the assembly instructions provided, for example, by the application assembler and help resolve any external dependencies declared by the application component provider. For distribution, the application archive and the deployment configuration information may be installed on various servers in the clusters via the deploy service API 804. The execution includes a request 816 made by the client 802 with the deploy service 806 at the server to start or propagate the deployment process.

The deploy server 806 may be transaction-oriented and use a persistent database, such as database 814, for storing the state or status of the deployed applications and deploy operations relating to the deployed applications. The deploy operations may include deployment, start, stop, update and remove. The persistent database 814 may be used to record and keep track of the deployment status based on, for example, the setting in the EJB's deployment descriptor. Stated differently, setting for the database 814 may be specified in the EJB's deployment descriptor, saving time by eliminating the need for separate setting and making the EJB portable across multiple databases and database servers. An EJB with such settings in combination with container-managed persistence helps offer a persistent database 814.

According to one embodiment, a mediator, such as configuration manager 824, between the database 814 and the server (having the deploy service 806 and the container 810) may be employed as part of the deployment architecture 800. As a mediator, the configuration manager 824 facilitates the representation of the database 814 as a set of root configurations. A set of root configuration includes several root configurations with each of the root configuration having a tree-like structure, containing configuration entries, files, and child configurations. Stated differently, the configuration manager 824 may represent the database 814 as the wood of the root configuration having various services, with each service using one or more trees associated with the wood. Furthermore, every configuration is referred to by a name and path, separated using a forward slash (/).

For example, the deploy service 806 may use root configurations "apps" and "deploy." The root configuration "deploy" may be used specifically for internal usage in the deploy service 806. The root configuration "apps" may be used for storing the state of the deployment and the files of deployed applications. The root configuration "apps" may have one or more child configurations naming the providers (e.g., SAP or sap.com) of all deployed applications. The subtree or child of root configuration "apps" may also represent the providers of the deployed application on the engine applications in addition to representing deployed applications. In one embodiment, the containers 810 may be used to store the state and the files of components 812—parts of the application—which are deployed on the corresponding containers. For example, the path of the configuration for application "MyApp" may be represented as "apps/<provider_name>/MyApp" (e.g., apps/SAP/MyApp or apps/sap.com/MyApp). The configuration for an application may be named "application configuration" and represent the configuration, for instance, using the path "apps/<provider_name>/MyApp."

The structure in which the data is organized in the database 814 may be the same as this data on a file system. In one embodiment, the deploy service 806 may have a property (e.g., "Applications_Folder") represented as a root directory for file structure of the applications in a similar way as "apps" represents the root configuration for configurations of the applications in the database 814. Further, the application directory may serve as a child directory of the root directory and may be named with an application name. When the deployed applications are correctly configured and uploaded in the database 814, the information relating to the deployed applications may be downloaded (e.g., files in the configuration) on an empty file space, and have the same structure as if it resides in the database 814. For example, the mapping may be as follows: configuration <-> directory, file entry in a configuration <-> file on the FS.

The communication between deploy service 806 and the container 810 may be bi-directional 818, 820 using a container API 808 having a container interface and a deploy communicator. The deploy service 806 communicates with the container 810 through the container interface, and the container 810, having obtained an instance of deploy communicator during its registration, communicates with the deploy service 806. The deploy communicator may be used by the container 810 to obtain an application directory and to perform deploy operations over the entire application. The information 820 may include status information relating to the state of various deploy operations and/or information relating to the container 810 itself. The result 822 of the status information is then forwarded to the client. The information relating to the container 810, however, may be used by the deploy service 806 to know essential information, such as whether a container is J2EE or non-J2EE, about various containers 810 in the cluster. In one embodiment, a deploy operation relating to an application is regarded successfully completed if the concerning container 810 successfully completes the deploy operation and the state of that deploy operation is committed to the database 814. In case of an unsuccessful deploy operation, the operation rolls back to a previous step.

The logical transaction of a deploy operation in the deploy service 806 may overlap the actual transaction in the database 814. When a request 816 for a deploy operation is received at the deploy service 806, it initiates 818 the deploy operation with the container 810. In one embodiment, the initiation 818 of the deploy operation also starts its logical transaction that may lead to the start of an actual transaction (e.g., submitting of the state of the deploy operation) with the database 814 via the configuration manager 824. For example, the configuration manager 814 may present the beginning of a transaction relating to the deploy service operation with the database 814 by obtaining a configuration handler. The container 810 may then be notified of the transaction to perform proper processing with regard to updating of the state of the deploy operation relating to the application. In one embodiment, if the deploy operation is successful, the transaction is committed in the database 814; else, the transaction is not committed and the deploy operation rolls back to the previous step.

According to one embodiment, the commit/rollback of the transaction may be accomplished by invoking the corresponding methods of the configuration handler. The commit/rollback of the transactional operation may be committed/rolled back on the server, which processes the request 816 (e.g., the server having the deploy service 806). If the transaction is committed, the deploy service 806 may also notify other servers in the cluster regarding the state of the deploy operation to facilitate localized updating and synchronizing of the information relating to the current application state at other servers. The other servers in the cluster may, upon notification from the deploy service 806, obtain such information from the database 814. In case of a failure in synchronizing or updating of the application state, an error may be transmitted to the client 802 indicating such failure. The transmission of the error may be performed without any of the servers knowing of such failure. The commitment of the deploy operation in the database 814 may be regarded as the indicator for a successful deploy operation. In one embodiment, the state of application may also be synchronized at the start of the process of deployment of the application to avoid any potential problems with regard to receiving and processing of the request 816.

In one embodiment, there are one or more exceptions concerning the container 810. The exceptions may include, for example, a deployment exception (<DeploymentException>) and a warning exception (<WarningException>). The deployment exception, which represents an error situation, may result in the rolling back of the transaction in the deploy service 806. The warning exception may be experienced at the end of a successfully completed method. The warning exception may facilitate collection of a set of warnings, which the container 810 may provide, as needed.

Figure 9:
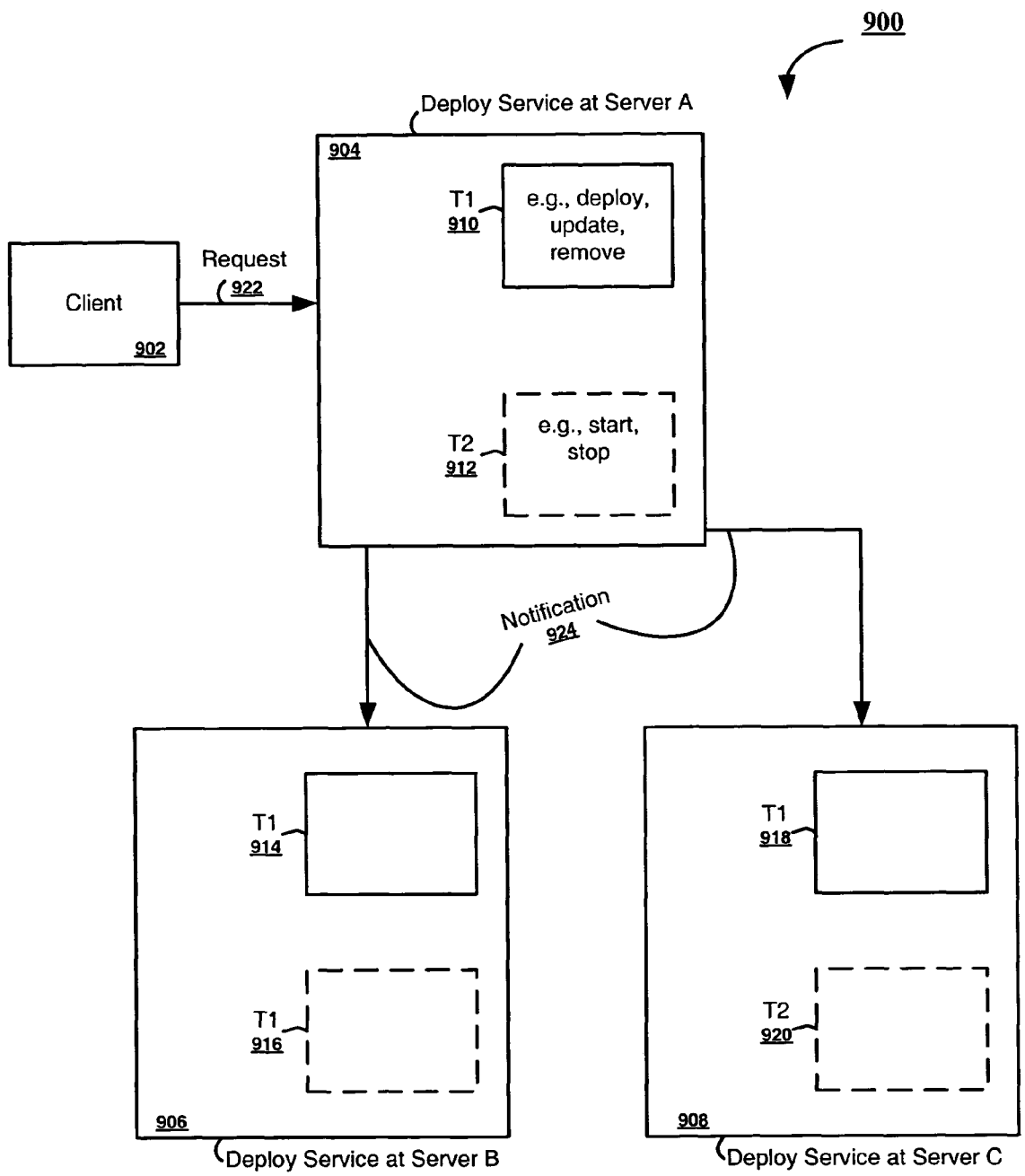
FIG. 9 is a block diagram illustrating an embodiment of a cluster of servers with each of the servers in the cluster having a deploy service.

FIG. 9 is a block diagram illustrating an embodiment of a cluster of servers 900 with each of the servers in the cluster 900 having a deploy service 904-908. A request 922 for deploy service operations (e.g., deploy, start, stop, remove and update) is placed by a client 902 with a deploy service at server A 904. The deploy service at server A 904 is one of the deploy services in a cluster 900 of servers with each servers having a corresponding deploy service, such as the deploy service at servers B and C 906-908.

In one embodiment, certain deploy service operations may be regarded as exceptional in terms of, for example, their frequency of occurrence or importance of performance. Such exception may be determined using various methods in the deploy service API. For example, the deploy service operations of starting and stopping of an application may be regarded as exceptional operations because of the frequent usage and importance of their performance. To accommodate the start and stop operations and to continue to perform the deploy service operations with efficiency and accuracy, a deploy service 904 may generate a separate thread T2 912. For example, when the deploy service 904 receives a request for starting or stopping of an application it creates a new thread T2 912 and generates the logic for stop and start operations using T2 912.

Once the thread T2 912 has been created, the deploy service 904 communicates the information regarding thread T2 912 by notifying 924 the deploy services 906-908 at other servers in the cluster 900. Each of the deploy services at servers A and B 906-908 may, in response to the notification 924 received from the deploy service at server A 904, create a thread T2 916, 920 of their own to facilitate the performance of certain deploy service operations, such as starting and stopping of the application, using the same logic as used by the deploy service 904. Furthermore, deploy services at servers A, B and C 904-908 in the cluster 900 may have access to and read the same information from the database using an application handler.

The deploy services 904-908 provide various deploy service operations relating to the deployment of an application, such as deploy, remove, start, stop and update. The deploy operation of the deploy service operations may include deployment of an application Enterprise ARchive (EAR or ear) files or standalone modules. The deployment of an ear file includes deployment of an entire J2EE or non-J2EE application as part of the ear file. The method used for deployment of the ear file may be as follows: <public String [ ] deploy (String earFile, String [ ] remoteSupport, Properties props) throws java.rmi.Remote Exception>. The remote exception is applied in case of a rollback. The properties may refer to the ones processed by the deploy service 904-908 and various containers. The deploy operation follows this process scheme and when this method is invoked, the deploy service 904-908 reads the content of the ear file being deployed.

In one embodiment, the following two types of applications/ear files are deployed: a standard J2EE application (e.g., meta-inf\application.xml) and a non-standard, non-J2EE application (e.g., meta-inf\application-j2ee-engine.xml). The standard J2EE application may include a standard eXtensible Markup Language (XML) application (e.g., application.xml) contained in the ear file (e.g., .ear) in accordance with the J2EE specification. The deploy service 904-908 may extract relevant information about the standard J2EE components and the context-roots for Web components from the ear file for the corresponding application.

With regard to a non-J2EE application, it includes an archive file (e.g., ear file, sda file) in accordance with a non-J2EE engine server. The archive file for the non-J2EE application may also include a standard application (e.g., application-j2ee-engine.xml). The information contained in archive file helps adjust the application on the server, including the following: references of the application to other applications, services, libraries and interfaces; names of the non J2EE components, found in the archive file and the names of the concerned non J2EE containers; type of failover property; names and types of jars not found in the archive file; names of the libraries not to be used the application. Having such as detailed descriptor helps provide additional features to facilitate the extension and expansion of the deploy service functionalities.

The application components' files may include J2EE component modules, non-J2EE component modules, and/or internal libraries for the application. For example, the J2EE component modules must be described in the application.xml, the non J2EE component modules may be described in the application-j2ee-engine.xml. If the J2EE and non-J2EE component modules are not described in their respective applications or application files, they are obtained by checking with a mechanism for automatic recognition of the components. If the J2EE and non-J2EE component modules are still not recognized even using this mechanism, they may then be considered as internal libraries of the application, and may not be distributed to any containers and may be loaded with the corresponding class loaders.

In one embodiment, various standalone modules may also be deployed. The standalone modules may include components deployable on a container, such as WAR, EJB, JAR, connector RAR, webdynpro archive, PAR, SAP specific archive types, etc. The deploy service may use the following method for the deployment of the standalone modules: <public String [ ] deploy (String archiveFile, String containerName, String [ ] remoteSupport, Properties props) throws java.rmi.RemoteException>. The archive file may refer to the path of the standalone module file, and the container name may refer to the container to which the file is deployed. If the container is not specified, the deploy service 904-908 may use the mechanism for automatic recognition of containers. The properties may refer to the ones processed by the deploy service 904-908 or various containers.

The deploy service operation for removal of an application form the database and from the servers in the cluster 900 may not follow a specific transaction scheme. In one embodiment, the removal of the application may continue even if the deployment exception is triggered. The application may be stopped before it is removed. The methods used for removing an application may include the following: (1) <public void remove (String applicationName) throws java.rmi.RemoteException>; (2) <public void remove (String providerName, String applicationName) throws java.rmi.RemoteException>; and (3) <public void remove (String applicationName) throws DeploymentException, WarningException>. Using any one of the methods, the application may be removed from the container. The provider name (e.g., SAP) refers to the provider of the application or other components and entities of the system. The deployment exception may refer to an error occurring during the remove operation; the process, however, continues. The warning exception may refer to an error of relatively little importance has occurred; however, the process may still continue.

The deploy service operation of stopping an application may refer to the stopping of the application and stopping of the resources of the application and making the application inaccessible to the client 902. The stop operation may follow a specific transaction scheme of the operations in the deploy service 904-908. A set of asynchronous methods to stop an application include: (1) <public void stopApplication(String applicationName) throws RemoteException>; (2) <public void stopApplication(String applicationName, String[ ] serverNames) throws RemoteException>; (3) <public void stopApplication(String providerName, String applicationName) throws RemoteException>; (4) <public void stopApplication(String providerName, String applicationName, String[ ] serverNames) throws RemoteException>. The synchronous method may include: <public void stopApplicationAndWait(String applicationName) throws RemoteException>.

The container going through the stop operation may use the following method: <public void prepareStop(String applicationName, Configuration applicationConfig) throws DeploymentException, WarningException>. The deployment exception is given if the components of the application may not be stopped. The stopping of the application may crash and the containers on which prepareStop( ) is being executed are notified of the rollback using the rollbackStopo method. The warning exception may contain certain warnings, but the stopping of the application may still continue.

The deploy operation of starting an application refers to starting a deployed application that remains in stopped mode. A set of asynchronous methods to stop an application include: (1) <public void startApplication(String applicationName) throws RemoteException>; (2) <public void startApplication (String applicationName, String[ ] serverNames) throws RemoteException>; (3) <public void startApplication(String providerName, String applicationName) throws RemoteException>; (4) <public void startApplication(String providerName, String applicationName, String[ ] serverNames) throws RemoteException>. The synchronous method may include: <public void startApplicationAndWait(String applicationName) throws RemoteException>.

The container going through the stop operation may use the following method: <public void downloadApplicationFiles (String applicationName, Configuration applicationConfig) throws DeploymentException, WarningException>. The name of the application being started and the application configuration, opened for read access, may be included. The deployment exception may refer to not being able to download the files and the start operation is rolled back. The warning exception may contain warning, but the start operation may still continue.

The deploy operation of updating an application refers to the updating, amending or changing of the application already deployed. In one embodiment, the updating of the application (e.g., ear file) may be performed using the remove operation (e.g., <remove ( )>) and the deploy operation (e.g., <deploy ( )>). The method used for performing the update operation may include: <public String[ ] update (String archiveName, Properties props) throws java.rmi.RemoteException>. The archive name may refer to a path to the updated ear file; the props refers to properties, needed for various containers to update concerning the components of the application, deployed on them. The warning exception is thrown or applied if the update operation is finished successfully, but with one or more warnings, and the remote exception is thrown if the update operation failed.

The container going through the update operation may use the following method: <public boolean needUpdate(File[ ] archiveFiles, ContainerDeploymentInfo dInfo, Properties props) throws DeploymentException, WarningException>. The archive files contain components to be updated. These components are for the container where the ear file is being updated. The <dinfo> may be the same as container deployment info in deployment, and props refers to properties holding information necessary for the process of deployment. The properties may be unlimited and specific for each container. The deployment exception occurs if an error occurs during checks and, if so, the update operation may not be performed, and the warning exception may be thrown if an error occurs during the check, but the update operation may still continue.

In one embodiment, a partial update of an application may be performed by updating a specified set of files from the components of the application. Stated differently, there may not be a need for rebuilding or recreating the entire ear file corresponding to an application because selective updating may be performed within one or more files where the update is needed or desired.

Figure 10:
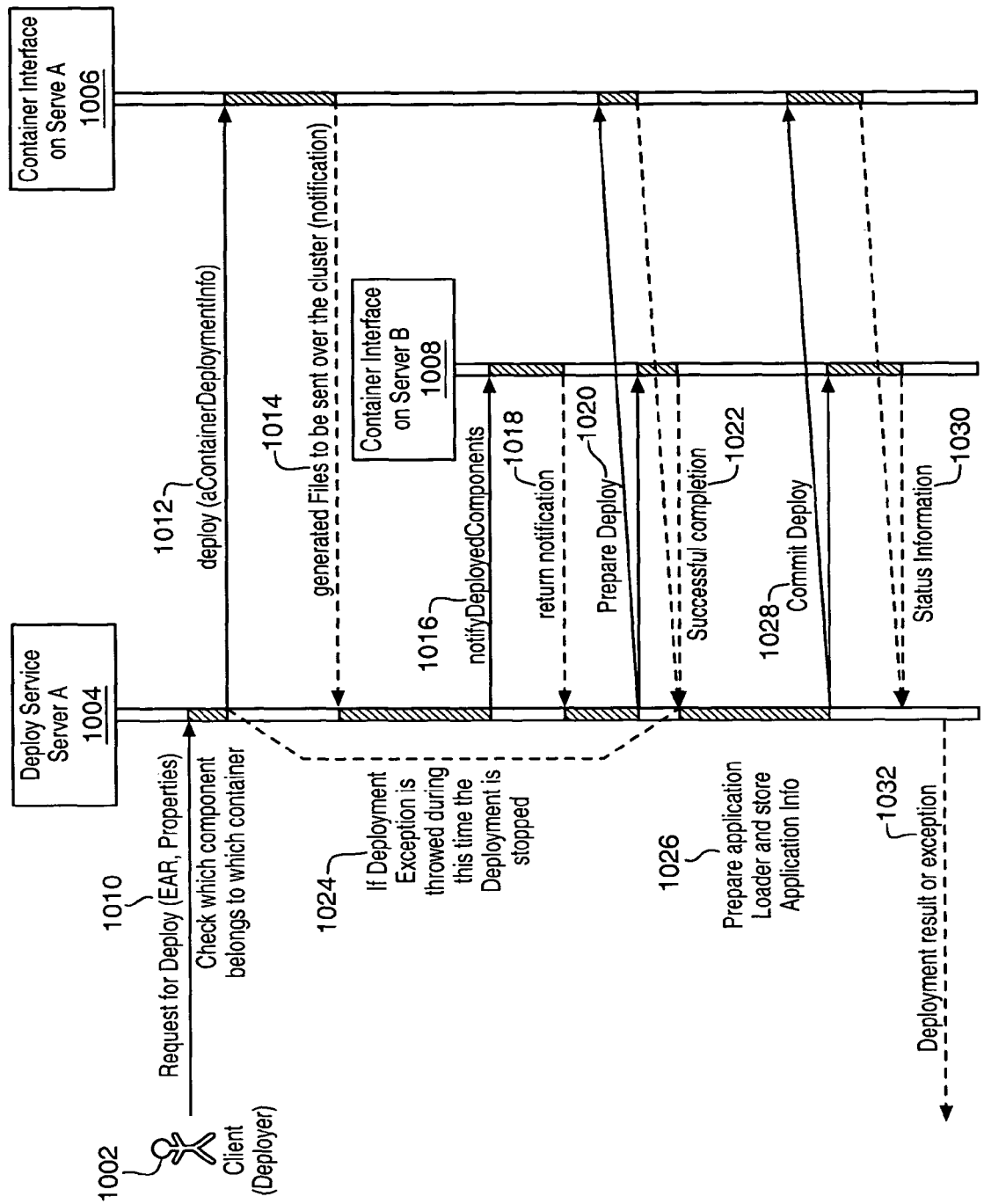
FIG. 10 is a block diagram illustrating an embodiment of an information transaction sequence in performing deploy service operations according to a transaction model.

FIG. 10 is a block diagram illustrating an embodiment of an information transaction sequence in performing deploy service operations according to a transaction model. As illustrated, a client (or deployer) 1002 requests the deploying of an application (e.g., ear file, properties) on various servers. The request 1010 for deployment is received by a deploy service at server A 1004 and, in response to the request, the deploy service 1004 initiates the deployment 1012 of the application with the corresponding container via a container API 1006. The initiation of the deployment 1012 includes initiating various deploy service operations (e.g., deploy, start, stop, remove and update) relating to the deployment of the application, and deploying of container deployment information. The deployment 1012 of the application may proceed with the following method: <public ApplicationDeployInfo deploy (File[ ] archiveFiles, ContainerDeploymentInfo dInfo, Properties props) throws DeploymentException>. The container via the container API 1006 may respond to the deploy service 1004 with files 1012 generated to be send over the cluster to other servers. Additionally, the container, via the container API 1006, may also send a return notification regarding the start of the application deployment process.

The deploy service 1004, upon receiving the files and notification 1012 from the container 1006, provides notification 1016 to deploy components of other containers at others servers, such as the container at server B via a container API 1008. The deploy service 1004 may include a single deploy service 1004 in direct communication with containers via the APIs 1006-1008 at other servers in the cluster, or the deploy service 1004 may be in indirect communication with the containers via the APIs 1006-1008 or via their corresponding deploy services. Stated differently, using the illustrated embodiment, the deploy service 1004 at server A may communicate directly with both containers via the APIs 1006-1008 at servers A and B, or the container at server B communicates with the deploy service 1004 via a corresponding deploy service at server B (not shown) and the API 1008. In either case, the notification 1016 may be provided by the deploy service 1004 (and/or another deploy service) using, for example, the following method: <public void notifyDeployedComponents(File [ ] archives, String applicationName, Properties props) throws DeploymentException, WarningException>. The container, via the container API 1008, sends a return notification 1018 to the deploy service at server A 1004.

Upon receiving the return notification 1018, the deploy service 1004 prepares 1020 for deployment of the application by using, for example, the following method: <public void prepareDeploy(String applicationName) throws DeploymentException, WarningException>. The successful communication 1022 relating to the deployment may be communicated from the containers at various servers 1006-1008, via their corresponding container APIs 1006-1008, to the deploy service 1004. In one embodiment, if a deployment exception is thrown 1024 or an error of some kind has occurred at anytime during the initiation of deployment 1012 and receiving of the successful communication 1022, the deployment may be stopped or rolled back to the previous step. In one embodiment, if the transaction is not committed, the rolling back of the transaction is performed using, for example, the following method: <public void rollbackDeploy(String applicationName) throws DeploymentException>.

According to one embodiment, upon receiving the successful communication 1022, an application loader is prepared and the application information is stored 1026. Furthermore, the successful deployment status relating to any or all of the deploy service operations may then be committed 1028 to their respective containers 1006-1008, via the corresponding container APIs 1106-1008, and to a database for performing transactional commitment of the state of deployment. The commitment 1028 regarding the application deployment may be performed by the deploy service 1004 using, for example, the following method: <public void commitDeploy(String applicationName) throws WarningException>. The status information 1030 regarding the deployment of the application and of the deploy service operations is communicated by the containers, via the respective container APIs 1006-1008, to the deploy service 1004. A result or exception 1032 is prepared based on the status information 1030 received at the deploy service and such result or exception 1032 is provided back to the client 1002.

Figure 11:
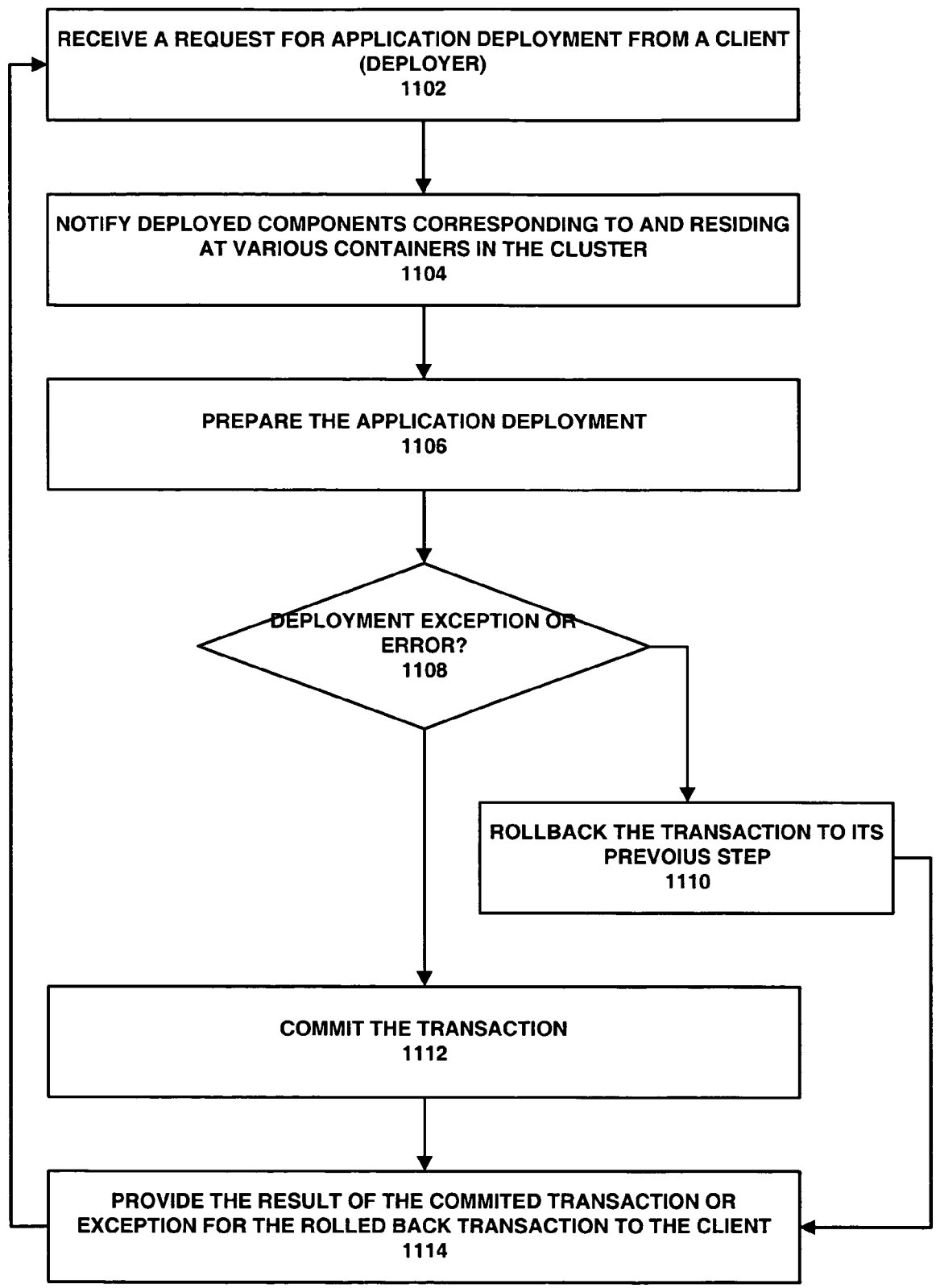
FIG. 11 is a flow diagram illustrating an embodiment of a process for performing deployment of an application according to a transactional model.

FIG. 11 is a flow diagram illustrating an embodiment of a process for performing deployment of an application according to a transactional model. A request for application deployment is received from a client or deployer at a deploy service of a server at processing block 1102. Upon receiving of the request, deployment components corresponding to and residing at various containers at various servers in the cluster are notified at processing block 1104. The deploy service prepares for the application deployment process at processing block 1106.

At decision block 1108, a determination is made as to whether a deployment exception was thrown due to an error in deploying. It the deployment exception is not thrown, the transaction is committed to the respective container (and to the database) at processing block 1112. If the deployment exception has occurred, the transaction is stopped and rolled back to its previous step at processing block 1110. Depending on whether the transaction was committed or rolled back, a result for the committed transaction or an exception for a rolled back transaction is provided back to the client at processing block 1114.

Figure 12:
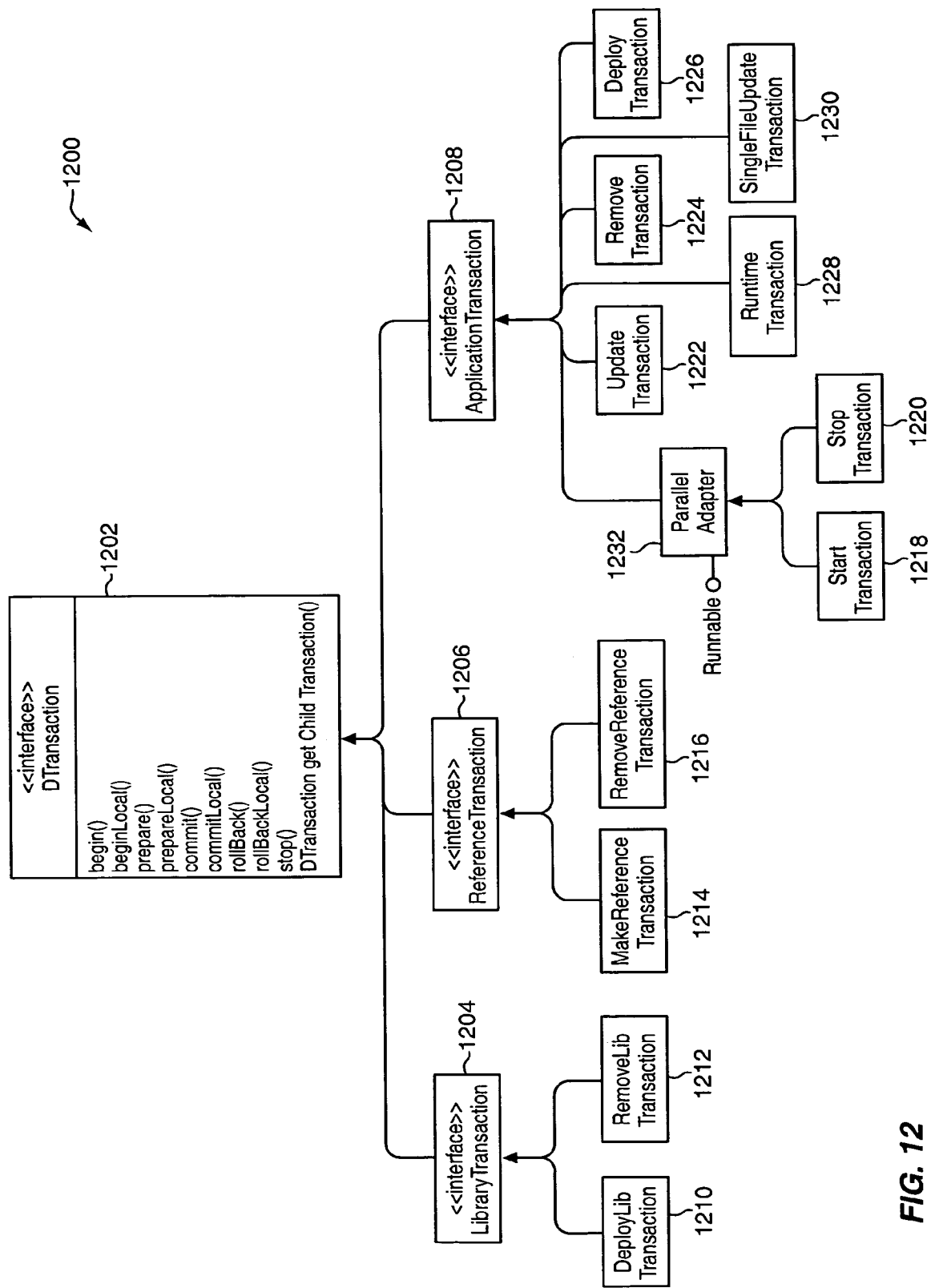
FIG. 12 is an exemplary illustration of an embodiment of a deploy service transaction tree.

FIG. 12 is an exemplary illustration of an embodiment of a deploy service transaction tree 1200. The transaction tree 1200 provides a deployment transaction window 1202 listing the deployment processes, such as begin, prepare, commit, rollback and stop, for various deployment transactions. In the illustrated embodiment, the deployment transactions include library transaction 1204, reference transaction 1206, and application transaction 1208. The library transaction 1204 includes transactions relating to deployment of a library 1210 and removal of a library 1212. The reference transaction 1206 includes transactions relating to making of a reference 1214 and removal of a reference 1216.

In one embodiment, the application transaction 1208 includes application deployment related transactions, such as start transaction 1218, stop transaction 1220, update transaction 1222, remove transaction 1224, and deploy transaction 1226. There may be additional transactions, such as runtime transaction 1128 and single file update transaction 1230 relating to the application transaction 1208. The start and stop transactions 1218-1220 may be performed via a parallel adapter 1232.

Figure 13:
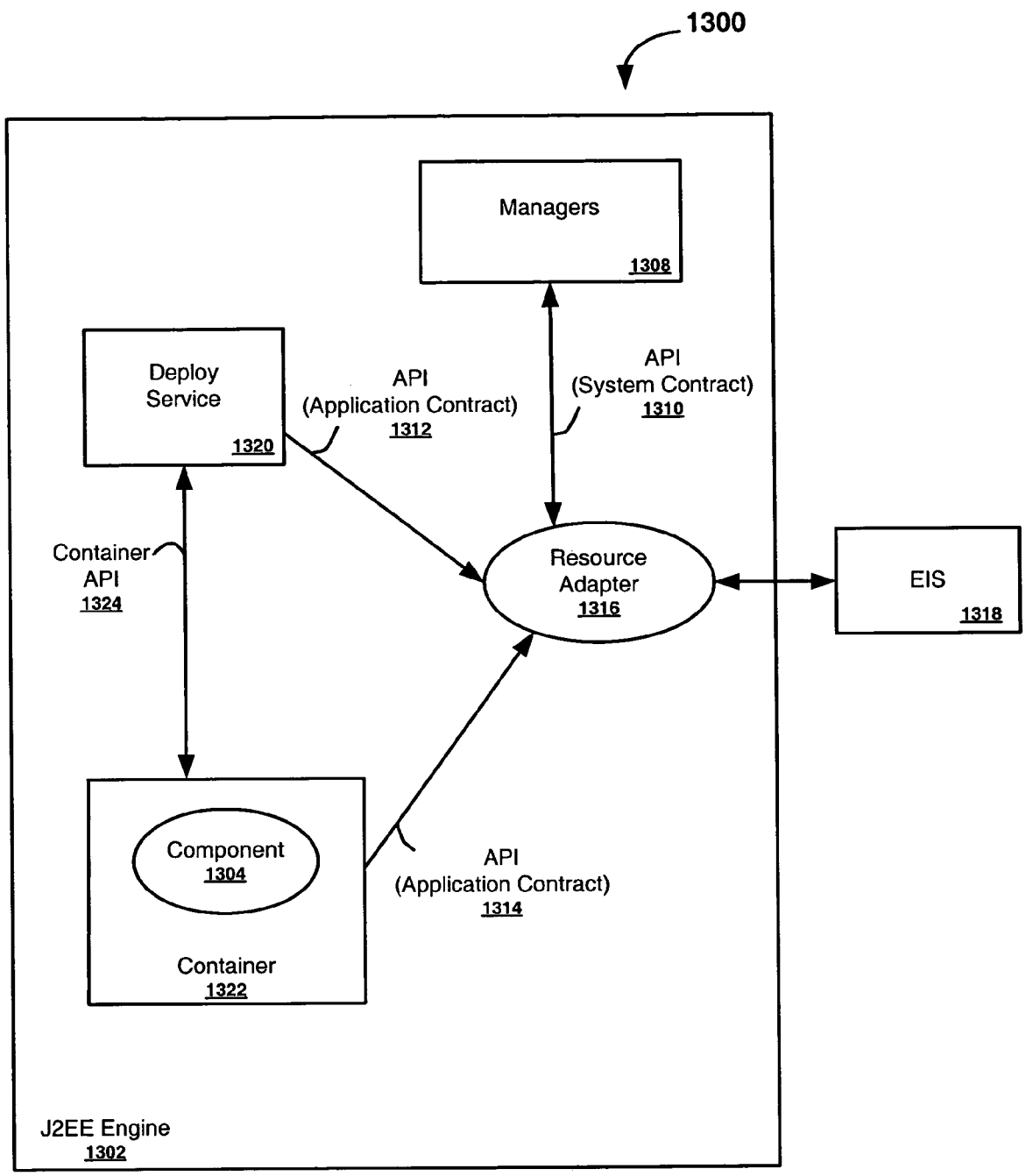
FIG. 13 is a block diagram illustrating an embodiment of a J2EE connector architecture including a deploy service.

FIG. 13 is a block diagram illustrating an embodiment of a J2EE connector architecture 1300 including a deploy service 1320. In the illustrated embodiment, the J2EE architecture 1300 enables application components 1304, including J2EE and non-J2EE components, to interact with an enterprise information system (EIS) 1318. Similarly, the J2EE and non- J2EE applications communicate with the EIS 1318 via the resource adapter 1316. The EIS software associated with the EIS 1318 may include various systems, enterprise resource planning (ERP), mainframe transaction processing, and databases. The EIS 1318 includes back-end database or data management components that run on the database server. The EIS 1318 may include persistent storages or databases, database servers, EJB servers, old systems, mySAP components, and the like. It is contemplated, not all components 1304 are required to have access to the EIS 1318.

As illustrated, the J2EE connector architecture 1300 includes a resource adapter 1316, also referred to as a component, to provide connectivity to a specific EIS or EIS system 1318. The resource adapters 1316 are provided by various EIS vendors. The J2EE connector architecture 1300 may also include various J2EE or non-J2EE products to allow the resources adapter 1316 to be plugged in to the platform implementation. A resource adapter 1316 may be stored in a Resource Adapter aRchive (RAR) file and deployed on a J2EE server, similar to an EAR file of a J2EE application. Also, an RAR file may reside in an EAR file or it may exist as a separate file.

According to one embodiment, a deploy service 1320 communicates with various containers 1322, each having application components 1304, via a container API 1324. The deploy service 1320 facilitates the management of the container 1322 and of the application assembled using the application component 1304. The deploy service 1320 and the container 1322 communicate with the resource adapter 1316' via application contracts or APIs 1312-1314. The resource adapter 1316 is then used by the deploy service 1320 and the container 1322 to communicate with the EIS 1318. Similarly, the mangers or services 1308 are linked with the resource adapter 1316 via an API or services contract 1310 to link the EIS 1318 with various services, such as security, transaction, and connectivity, managed by the server. The APIs 1310-1314 are implemented by the resource adapter 1316.

Figure 14:
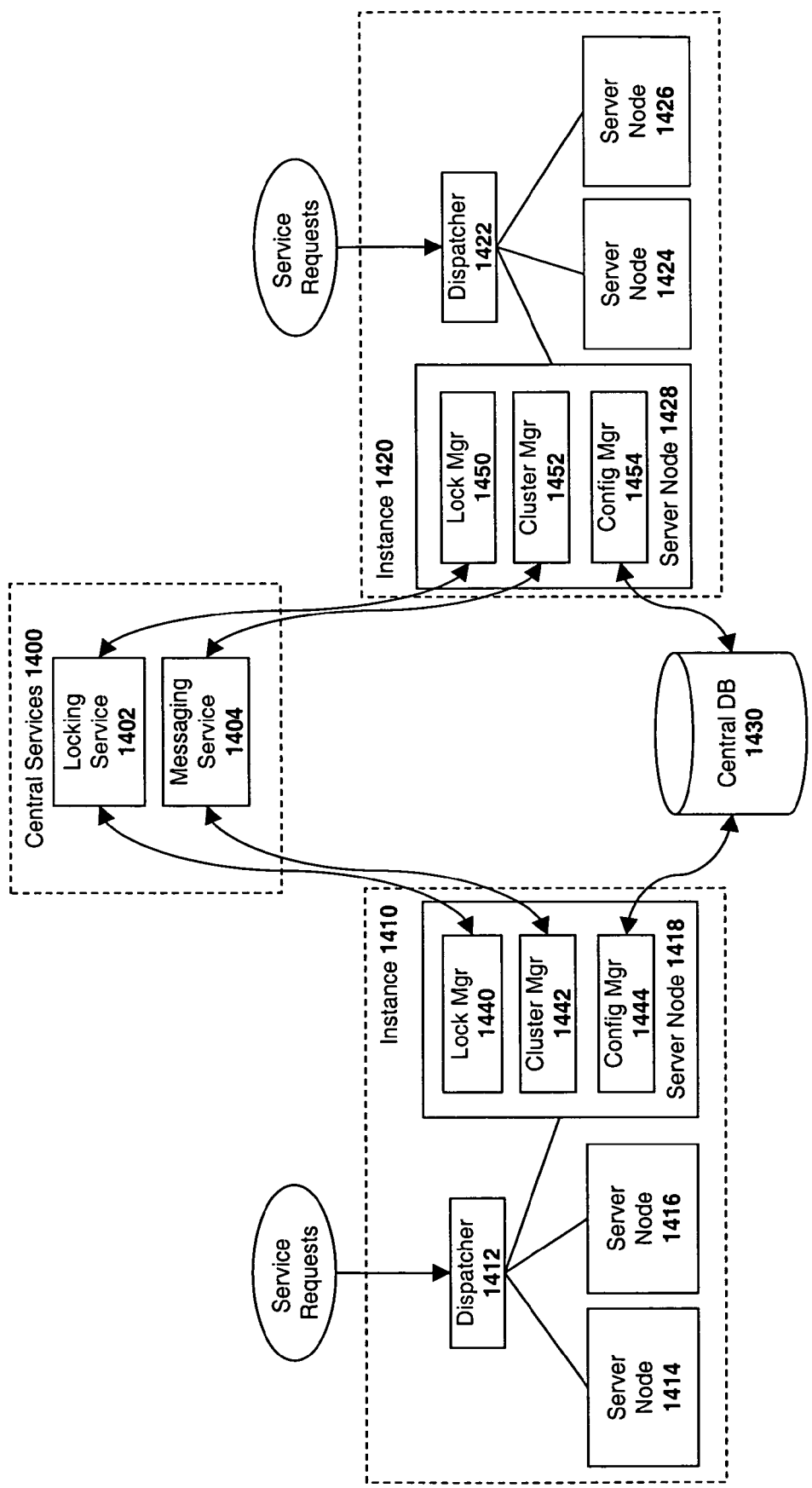
FIG. 14 is a block diagram illustrating an embodiment of a server node system architecture.

A system architecture according to one embodiment of the invention is illustrated in FIG. 14. The architecture includes a central services instance 1400 and a plurality of application server instances 1410, 1420. As used herein, the application server instances, 1410 and 1420, each include a group of server nodes 1414, 1416, 1418 and 1424, 1426, 1428, respectively, and a dispatcher, 1412, 1422, respectively. The central services instance 1400 includes a locking service 1402 and a messaging service 1404 (described below). The combination of all of the application server instances 1410, 1420 and the central services instance 1400 is referred to herein as a "cluster." Although the following description will focus solely on instance 1410 for the purpose of explanation, the same principles apply to other instances such as instance 1420.

The server nodes 1414, 1416, 1418 within instance 1410 provide the business and/or presentation logic for the network applications supported by the system. Each of the server nodes 1414, 1416, 1418 within a particular instance 1410 may be configured with a redundant set of application logic and associated data. In one embodiment, the dispatcher 1410 distributes service requests from clients to one or more of the server nodes 1414, 1416, 1418 based on the load on each of the servers. For example, in one embodiment, the dispatcher 1410 implements a round-robin policy of distributing service requests.

The server nodes 1414, 1416, 1418 may be Java 2 Enterprise Edition ("J2EE") server nodes which support Enterprise Java Bean ("EJB") components and EJB containers (at the business layer) and Servlets and Java Server Pages ("JSP") (at the presentation layer). Of course, the embodiments of the invention described herein may be implemented in the context of various different software platforms including, by way of example, Microsoft .NET platforms and/or the Advanced Business Application Programming ("ABAP") platforms developed by SAP AG, the assignee of the present application.

In one embodiment, communication and synchronization between each of the instances 1410, 1420 is enabled via the central services instance 1400. As illustrated in FIG. 14, the central services instance 1400 includes a messaging service 1404 and a locking service 1402. The message service 1404 allows each of the servers within each of the instances to communicate with one another via a message passing protocol. For example, messages from one server may be broadcast to all other servers within the cluster via the messaging service 1404 (e.g., such as the cache configuration messages described below). Alternatively, messages may be addressed directly to specific servers within the cluster (i.e., rather than being broadcast to all servers).

In one embodiment, the locking service 1402 disables access to (i.e., locks) certain specified portions of configuration data and/or program code stored within a central database 1430 or resources shared in the cluster by different services. The locking manager locks data on behalf of various system components which need to synchronize access to specific types of data and program code (e.g., such as the configuration managers 1444, 1454). As described in detail below, the locking service enables a distributed caching architecture for caching copies of server/dispatcher configuration data.

In one embodiment, the messaging service 1404 and the locking service 1402 are each implemented on dedicated servers. However, the messaging service 1404 and the locking service 1402 may be implemented on a single server or across multiple servers while still complying with the underlying principles of the invention.

As illustrated in FIG. 14, each server node (e.g., 1418, 1428) includes a lock manager 1440, 1450 for communicating with the locking service 1402; a cluster manager 1442, 1452 for communicating with the messaging service 1404; and a configuration manager 1444, 1454 for communicating with a central database 1430 (e.g., to store/retrieve configuration data as described herein). Although the lock manager 1440, 1450, cluster manager 1442, 1452 and configuration manager 1444, 1454 are illustrated only with respect to server nodes 1418 and 1428 in FIG. 14, each of the server nodes 1414, 1416, 1424 and 1426 and/or on the dispatchers 1412, 1422 may be equipped with equivalent lock managers, cluster managers and configuration managers while still complying with the underlying principles of the invention.

Figure 15:
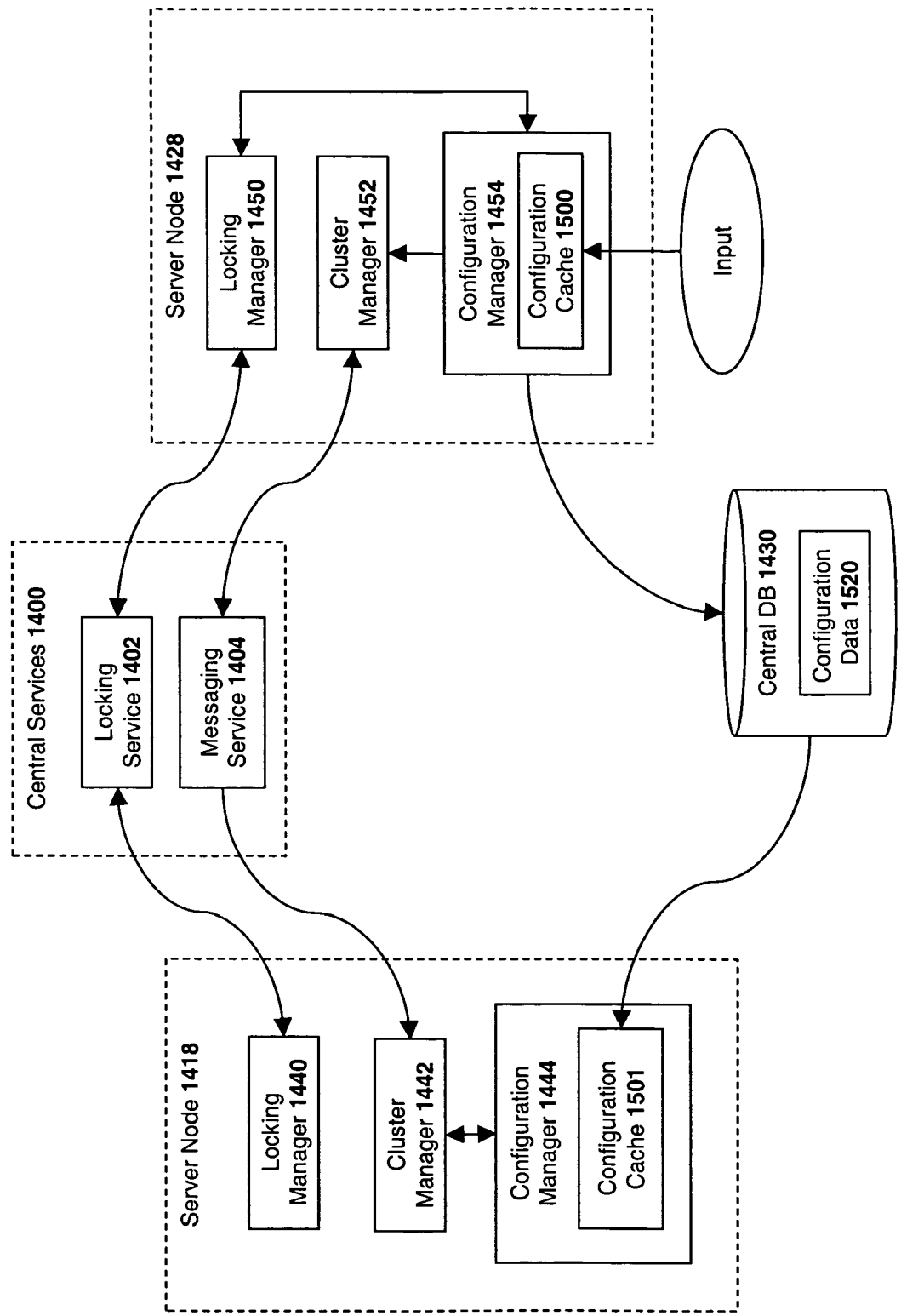
FIG. 15 is a block diagram illustrating an embodiment of a server node architecture which employs a configuration data caching.

Referring now to FIG. 15, in one embodiment, configuration data 1520 defining the configuration of the central services instance 1400 and/or the server nodes and dispatchers within instances 1410 and 1420, is stored within the central database 1430. By way of example, the configuration data may include an indication of the kernel, applications and libraries required by each dispatcher and server; network information related to each dispatcher and server (e.g., address/port number); an indication of the binaries required during the boot process for each dispatcher and server, parameters defining the software and/or hardware configuration of each dispatcher and server (e.g., defining cache size, memory allocation, . . . etc), and various other types of information related to the cluster. It should be noted, however, that the underlying principles of the invention are not limited to any particular set of configuration data.

In one embodiment of the invention, to improve the speed at which the various servers and dispatchers access the configuration data, the configuration managers 1444, 1454 cache configuration data locally within configuration caches 1500, 1501. As such, to ensure that the configuration data within the configuration caches 1500, 1501 remains up-to-date, the configuration managers 1444, 1454 implement cache synchronization policies, as described herein.

Figure 16:
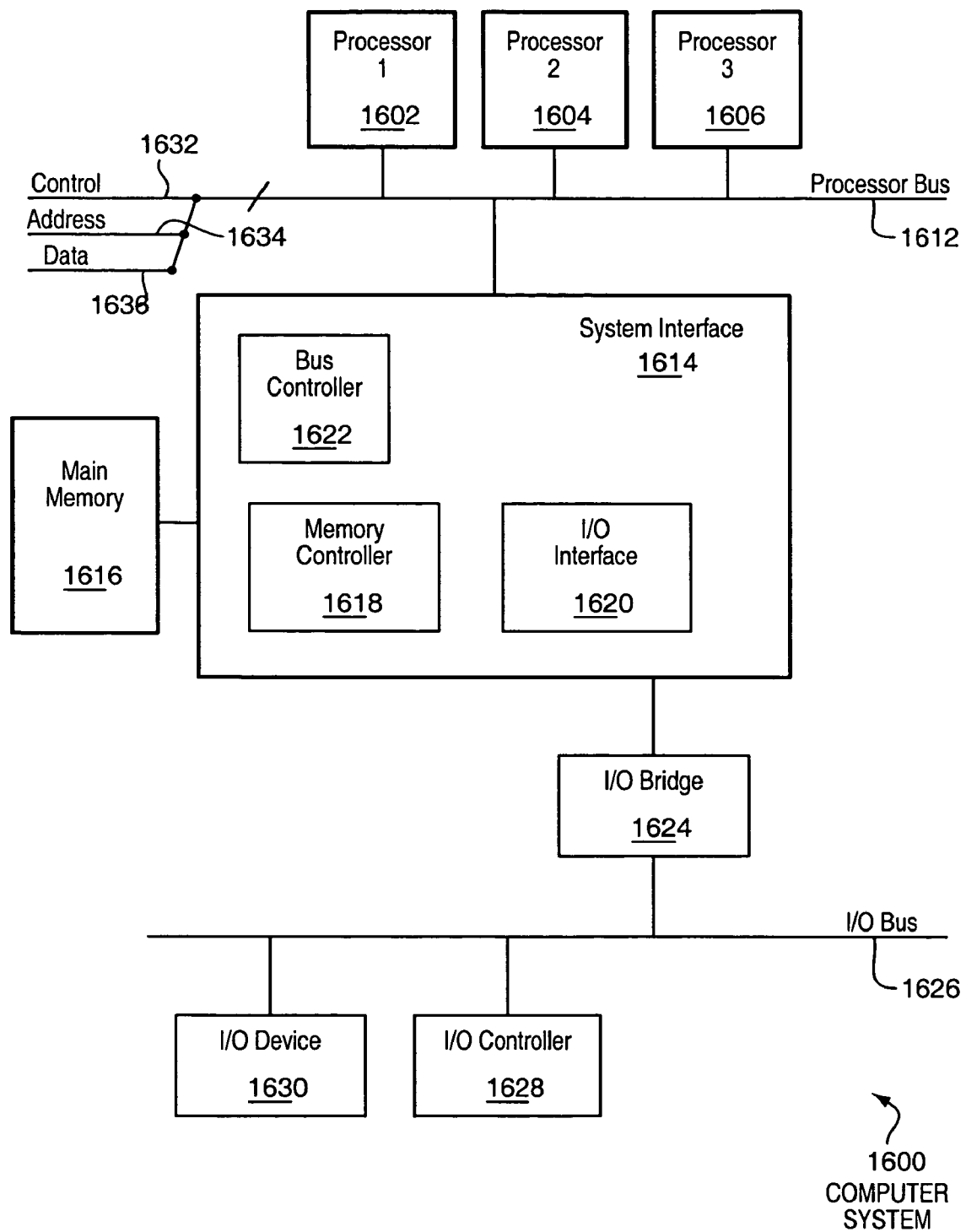
FIG. 16 is an exemplary computer system used in implementing an embodiment of the present invention.

FIG. 16 is an exemplary computer system 1600 used in implementing an embodiment of the present invention. The computer system (system) 1600 includes one or more processors 1602-1606. The processors 1602-1606 may include one or more single-threaded or multi-threaded processors. A typical multi-threaded processor may include multiple threads or logical processors, and may be capable of processing multiple instruction sequences concurrently using its multiple threads. Processors 1602-1606 may also include one or more internal levels of cache (not shown) and a bus controller or bus interface unit to direct interaction with the processor bus 1612.

Processor bus 1612, also known as the host bus or the front side bus, may be used to couple the processors 1602-1606 with the system interface 1614. Processor bus 1612 may include a control bus 1632, an address bus 1634, and a data bus 1636. The control bus 1632, the address bus 1634, and the data bus 1636 may be multidrop bi-directional buses, e.g., connected to three or more bus agents, as opposed to a point-to-point bus, which may be connected only between two bus agents.

System interface 1614 (or chipset) may be connected to the processor bus 1612 to interface other components of the system 1600 with the processor bus 1612. For example, system interface 1614 may include a memory controller 1618 for interfacing a main memory 1616 with the processor bus 1612. The main memory 1616 typically includes one or more memory cards and a control circuit (not shown). System interface 1614 may also include an input/output (I/O) interface 1620 to interface one or more I/O bridges or I/O devices with the processor bus 1612. For example, as illustrated, the I/O interface 1620 may interface an I/O bridge 1624 with the processor bus 1612. I/O bridge 1624 may operate as a bus bridge to interface between the system interface 1614 and an I/O bus 1626. One or more I/O controllers and/or I/O devices may be connected with the I/O bus 1626, such as I/O controller 1628 and I/O device 1630, as illustrated. I/O bus 1626 may include a peripheral component interconnect (PCI) bus or other type of I/O bus.

System 1600 may include a dynamic storage device, referred to as main memory 1616, a RAM, or other devices coupled to the processor bus 1612 for storing information and instructions to be executed by the processors 1602-1606. Main memory 1616 also may be used for storing temporary variables or other intermediate information during execution of instructions by the processors 1602-1606. System 1600 may include a ROM and/or other static storage device coupled to the I/O bus 1626 for storing static information and instructions for the processors 1602-1606.

Main memory 1616 or dynamic storage device may include a magnetic disk or an optical disc for storing information and instructions. I/O device 1630 may include a display device (not shown), such as a cathode ray tube (CRT) or liquid crystal display (LCD), for displaying information to an end user. For example, graphical and/or textual indications of installation status, time remaining in the trial period, and other information may be presented to the prospective purchaser on the display device. I/O device 1630 may also include an input device (not shown), such as an alphanumeric input device, including alphanumeric and other keys for communicating information and/or command selections to the processors 1602-1606. Another type of user input device includes cursor control, such as a mouse, a trackball, or cursor direction keys for communicating direction information and command selections to the processors 1602-1606 and for controlling cursor movement on the display device.

System 1600 may also include a communication device (not shown), such as a modem, a network interface card, or other well-known interface devices, such as those used for coupling to Ethernet, token ring, or other types of physical attachment for purposes of providing a communication link to support a local or wide area network, for example. Stated differently, the system 1600 may be coupled with a number of clients and/or servers via a conventional network infrastructure, such as a company's Intranet and/or the Internet, for example.

It is appreciated that a lesser or more equipped system than the example described above may be desirable for certain implementations. Therefore, the configuration of system 200 may vary from implementation to implementation depending upon numerous factors, such as price constraints, performance requirements, technological improvements, and/or other circumstances.

It should be noted that, while the embodiments described herein may be performed under the control of a programmed processor, such as processors 202-206, in alternative embodiments, the embodiments may be fully or partially implemented by any programmable or hardcoded logic, such as field programmable gate arrays (FPGAs), TTL logic, or application specific integrated circuits (ASICs). Additionally, the embodiments of the present invention may be performed by any combination of programmed general-purpose computer components and/or custom hardware components. Therefore, nothing disclosed herein should be construed as limiting the various embodiments of the present invention to a particular embodiment wherein the recited embodiments may be performed by a specific combination of hardware components.

Figure 17:
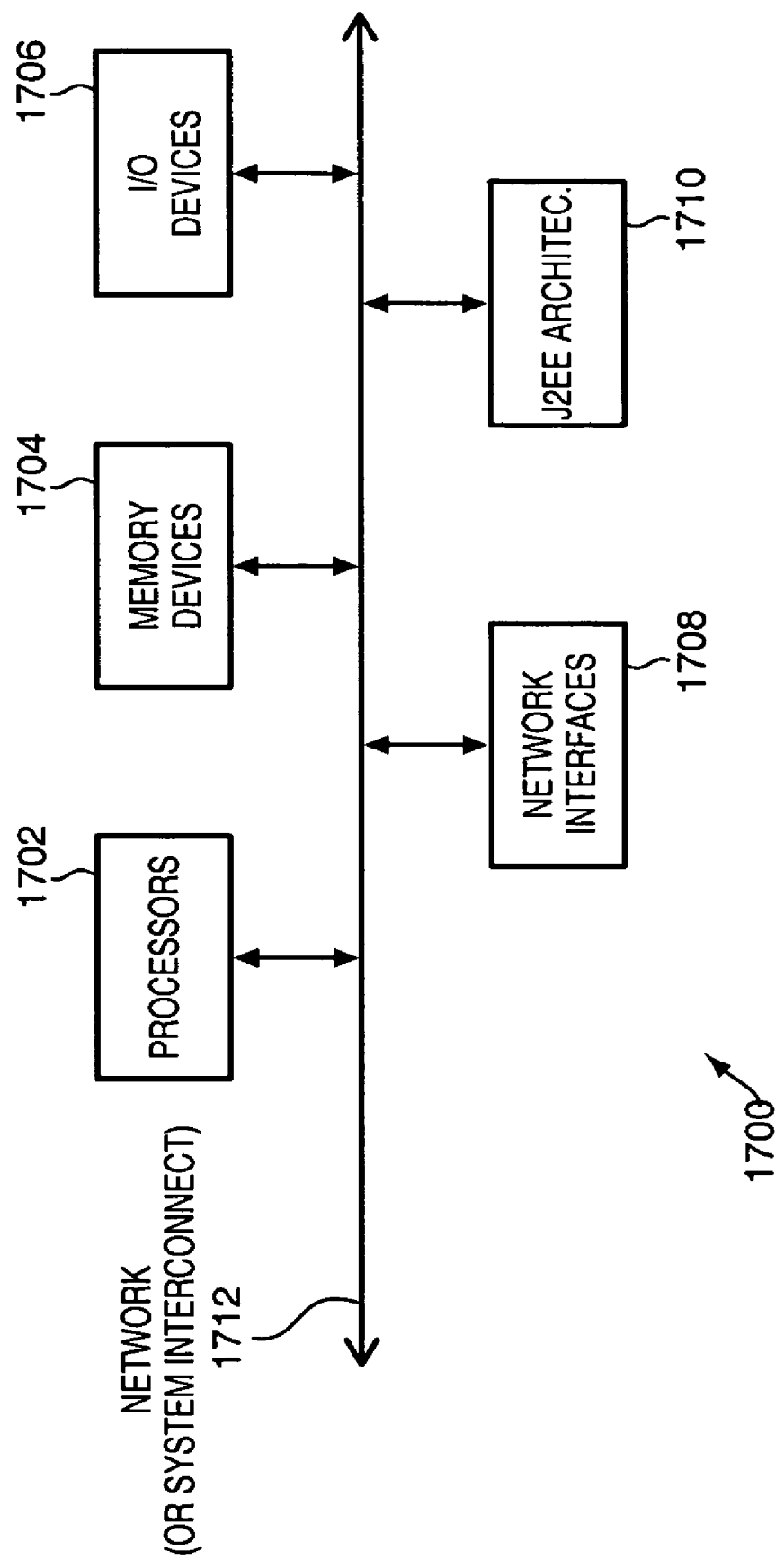
FIG. 17 is a block diagram illustrating an embodiment of a node implementation in a network.

FIG. 17 is a block diagram illustrating an embodiment of a node 1700 implementation in a network. According to one embodiment, the node 1700 may include one or more processors 1702 (e.g., processors 1602-1606 of FIG. 16), one or more memory devices 1704 (e.g., main memory 1616 of FIG. 16), one or more Input/Output (I/O) devices 1706 (e.g., I/O devices 1630 of FIG. 16), one or more network interfaces 1708, and J2EE architecture 1710, directly or indirectly, connected together and in communication with the network through a system or network interconnect 1712. The processors 1702 may include microprocessors, microcontrollers, FPGAs, ASICs, central processing units (CPUs), programmable logic devices (PLDs), and similar devices that access instructions from a system storage (e.g., memory 1704), decode them, and execute those instructions by performing arithmetic and logical operations.

The J2EE architecture 1710 may include a transaction model for deployment operations based on various J2EE and non-J2EE containers, components, resources, services, and interfaces. The J2EE and non-J2EE components may include executable content, control logic (e.g., ASIC, PLD, FPGA, etc.), firmware, or some combination thereof, in one embodiment of the present invention. In embodiments of the invention in which the J2EE architecture 1710 may include executable content, it may be stored in the memory device 1704 and executed by the control processor 1702.

Memory devices 1704 may encompass a wide variety of memory devices including ROM, EPROM, EEPROM, RAM, non-volatile random access memory (NVRAM), cache memory, flash memory, and other memory devices. Memory devices 1704 may also include one or more hard disks, floppy disks, ZIP disks, compact disks (e.g., CD-ROM), digital versatile/video disks (DVD), magnetic random access memory (MRAM) devices, and other system-readable media that store instructions and/or data. Memory devices 1704 may store program modules, such as routines, programs, objects, images, data structures, program data, and other program modules that perform particular tasks or implement particular abstract data types that facilitate system use.

The I/O devices 1706 may include hard disk drive interfaces, magnetic disk drive interfaces, optical drive interfaces, parallel ports, serial controllers or super I/O controllers, serial ports, universal serial bus (USB) ports, display device interfaces (e.g., video adapters), network interface cards (NICs), sound cards, modems, and the like. System interconnect or network 1712 may permit communication between the various elements of node 1700. System interconnects 1712 may include a wide variety of signal lines including one or more of memory buses, peripheral buses, local buses, host buses, and bridge, optical, electrical, acoustical, and other propagated signal lines.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

While certain exemplary embodiments have been described and shown in the accompanying drawings, it is to be understood that such embodiments are merely illustrative of and not restrictive, and that the embodiments of the present invention are not to be limited to specific constructions and arrangements shown and described, since various other modifications may occur to those ordinarily skilled in the art upon studying this disclosure.

What is claimed is:

1. A method comprising:
   executing a transaction including an operation to deploy a first deployment services and a second deployment services;
   deploying the first deployment services at a first container corresponding to a first software application associated with a first programming engine, the first deployment services relating to deploying and running of the first software application at an application server of a primary computer system of a plurality of computer systems;
   deploying the second deployment services at a second container corresponding to a second software application associated with a second programming engine, the second deployment services relating to deploying and running of the second software application at the application server of the primary computer system, the first deployment services being compatible with the first container and incompatible with the second container, the second deployment services being compatible with the second container and incompatible with the first container, the first container being incompatible with the second container due to the first programming engine being incompatible with the second programming engine;
   establishing, via a deployment container interface, bi-directional communication between the first container and the second container such that the first container is capable of accessing the second deployment services at the second container, and the second container is capable of accessing the first deployment services at the first container;
   determining whether a deployment error occurred during an execution of one of the deployment services;
   in response to determining a deployment error did not occur, committing the execution of the one of the deployment services at the respective container; and
   in response to determining a deployment error occurred, rolling back the execution of the transaction to a state previous to the operation.

2. The method of claim 1, wherein the first and second deployment services include a start operation, a stop operation, a remove operation, and an update operation.

3. The method of claim 1, further comprising sending a notification signal of the deployment of the first and second deployment services on the primary computer system to one or more secondary computer systems of the plurality of computer systems.

4. The method of claim 3, further comprising initiating a deployment transaction at one or more application servers associated with the one or more secondary computer systems allowing one or more software applications deployed at the one or more application servers to access the first and second deployment services at the primary computer system.

5. A system comprising:
   a server computer system in a network of server computer systems, the server computer system including an application server to
     execute a transaction including an operation to deploy a first deployment services and a second deployment services;
     deploy the first deployment services transaction at a first container corresponding to a first software application associated with a first programming engine, the first deployment services relating to deploying and running of the first software application at an application server of a primary computer system of a plurality of computer systems;
     deploy the second deployment services at a second container corresponding to a second software application associated with a second programming engine, the second deployment services relating to deploying and running of the second software application at the application server of the primary computer system, the first deployment services being compatible with the first container and incompatible with the second container, the second deployment services being compatible with the second container and incompatible with the first container, the first container being incompatible with the second container due to the first programming engine being incompatible with the second programming engine;

establish, via a deployment container interface, bi-directional communication between the first container and the second container such the first container is capable of accessing the second deployment services at the second container, and the second container is capable of accessing the first deployment services at the first container;

determine whether a deployment error occurred during an execution of one of the deployment services;

in response to determining a deployment error did not occur, commit the execution of the one of the deployment services at the respective container; and in response to determining a deployment error occurred, roll back the execution of the transaction to a state previous to the operation.

6. A machine-readable storage medium comprising instructions which, when executed, cause a machine to:

execute a transaction including an operation to deploy a first deployment services and a second deployment services;

deploy the first deployment services at a first container corresponding to a first software application associated with a first programming engine, the first deployment services relating to deploying and running of the first software application at an application server of a primary computer system of a plurality of computer systems;

deploy the second deployment services at a second container corresponding to a second software application associated with a second programming engine, the second deployment services relating to deploying and running of the second software application at the application server of the primary computer system, the first deployment services being compatible with the first container and incompatible with the second container, the second deployment services being compatible the second container and incompatible with the first container, the first container being incompatible with the second container due to the first programming engine being incompatible with the second programming engine;

establish, via a deployment container interface, bi-directional communication between the first container and the second container such the first container is capable of accessing the second deployment services at the second container, and the second container is capable of accessing the first deployment services at the first container;

determine whether a deployment error occurred during an execution of one of the deployment services;

in response to determining a deployment error did not occur, commit the execution of the one of the deployment services at the respective container; and in response to determining a deployment error occurred, roll back the execution of the transaction to a state previous to the operation.

7. The machine-readable storage medium of claim 6, wherein the first and second deployment services include a start operation, a stop operation, a remove operation, and an update operation.

8. The machine-readable storage medium of claim 6, wherein the instructions when executed, further cause the machine to provide a notification signal of the deployment of the first and second deployment services on the primary computer system to one or more secondary computer systems of the plurality of computer systems.

9. The method of claim 1, wherein the first container includes a Java 2 Enterprise Edition (J2EE) container, and wherein the second container includes an Advanced Business Application Programming (ABAP) container.

10. The system of claim 5, wherein the first container includes a Java 2 Enterprise Edition (J2EE) container, and wherein the second container includes an Advanced Business Application Programming (ABAP) container.

11. The machine-readable storage medium of claim 6, wherein the first container includes a Java 2 Enterprise Edition (J2EE) container, and wherein the second container includes an Advanced Business Application Programming (ABAP) container.

12. The method of claim 1, wherein the first programming engine includes a J2EE programming engine, and wherein the second programming engine includes an ABAP programming engine.

13. The system of claim 5, wherein the first programming engine includes a J2EE programming engine, and wherein the second programming engine includes an ABAP programming engine.

14. The machine-readable medium of claim 6, wherein the first programming engine includes a J2EE programming engine, and wherein the second programming engine includes an ABAP programming engine.

* * * * *